(12) United States Patent
Kerres et al.

(10) Patent No.: US 7,288,599 B2
(45) Date of Patent: Oct. 30, 2007

(54) OLIGOMERS AND POLYMERS CONTAINING SULFINATE GROUPS, AND METHOD FOR PRODUCING THE SAME

(76) Inventors: Jochen Kerres, Asternweg 11, 73760 Ostfildern (DE); Thomas Häring, Feigenweg 15, 70619 Stuttgart (DE)

( * ) Notice: Subject to any disclaimer, the term of this patent is extended or adjusted under 35 U.S.C. 154(b) by 271 days.

(21) Appl. No.: 10/929,991

(22) Filed: Aug. 30, 2004

(65) Prior Publication Data

US 2005/0165172 A1 Jul. 28, 2005

Related U.S. Application Data

(63) Continuation of application No. PCT/DE03/00733, filed on Feb. 28, 2003.

(30) Foreign Application Priority Data

| Feb. 28, 2002 | (DE) | ................................ 102 08 679 |
| Feb. 28, 2002 | (DE) | ................................ 102 09 786 |
| Dec. 23, 2002 | (DE) | ................................ 102 61 784 |

(51) Int. Cl.
*C08F 8/02* (2006.01)

(52) U.S. Cl. .................... 525/319; 525/327.5; 525/340; 525/343; 525/348; 525/359.1; 525/359.2; 525/359.3; 525/375; 525/385

(58) Field of Classification Search ................ 525/319, 525/327.5, 340, 343, 348, 359.1, 359.2, 359.3, 525/375, 385

See application file for complete search history.

(56) References Cited

U.S. PATENT DOCUMENTS

| 2,628,193 | A | * | 2/1953 | D Alelio ...................... 521/33 |
| 6,221,923 | B1 | * | 4/2001 | Schnurnberger et al. ...... 521/27 |
| 6,552,135 | B2 | * | 4/2003 | Schnurnberger et al. .... 525/536 |

FOREIGN PATENT DOCUMENTS

| WO | 02/00773 A2 | 1/2002 |
| WO | 03/022892 A2 | 3/2003 |

OTHER PUBLICATIONS

Kerres, J.A. et al., "New Sulfonated Engineering Polymers Via the Metalation Route. II. Sulfinated/Sulfonated Poly (Ether Sulfone) PSU Udel and its Crosslinking", Journal of Polymer Science, Polymer Chemistry Edition, vol. 36, 1997, pp. 1441-1448, John Wiley and Sons, New York, U.S.

Kerres, J.A. et al., "Development and Characterization of Crosslinked Ionomer Membranes Based Upon Sulfinated and Sulphonated PSU. Crosslinked PSU Blend Membranes By Alkylation of Sulfinate Groups With Dihalogenoalkanes", Journal of Membrane Science, vol. 139, 1998, pp. 227-241, Elsevier Scientific Publishing Company, Amsterdam, NL.

* cited by examiner

*Primary Examiner*—Bernard Lipman
(74) *Attorney, Agent, or Firm*—Fitch, Even, Tabin & Flannery

(57) ABSTRACT

The invention relates to polymers obtained by S-alkylation of sulfinated polymers with alkylation agents, and AB-cross-linked polymers obtained by reacting polymers containing alkylation groups with low-molecular sulfinates, under S-alkylation, or AB-cross-linked polymers obtained by S-alkylation of sulfinated polymers with polymers containing alkylation groups.

20 Claims, 15 Drawing Sheets

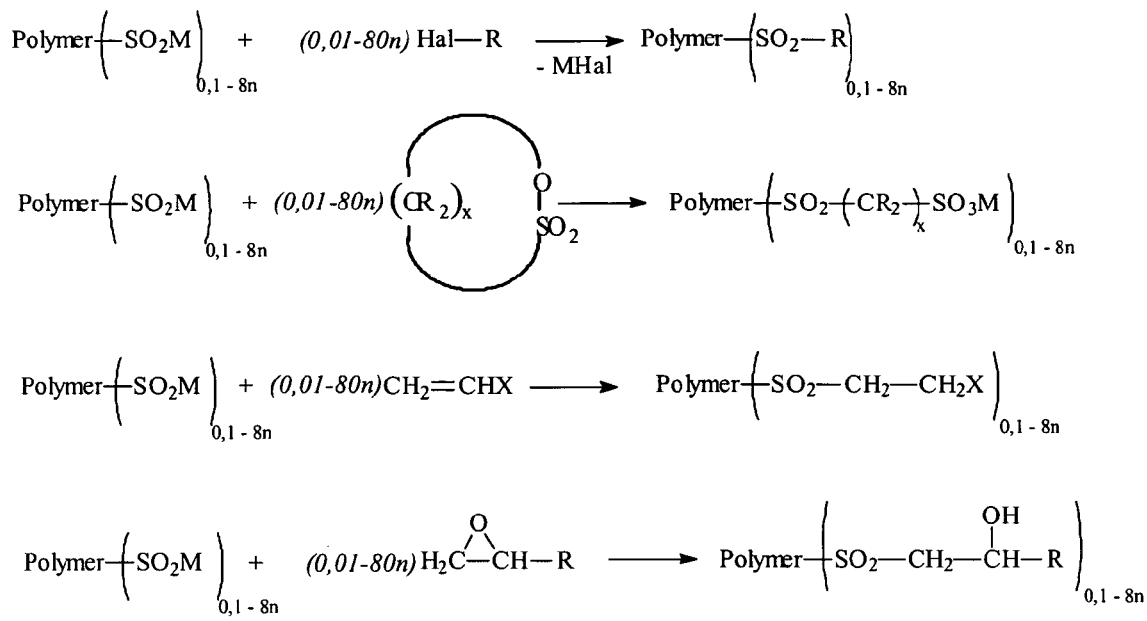
Fig. 1: Reactions of sulfinated polymers with alkylation agents (R represents alkyl, aryl, any organic radical, M represents alkali ions or alkaline-earth ions or any monovalent or bivalent metal cation or ammonium cation, Polymer represents any polymer main chain, Hal represents F, Cl, Br, I, x represents a number between 2 and 20, X represents electron-attracting groups)

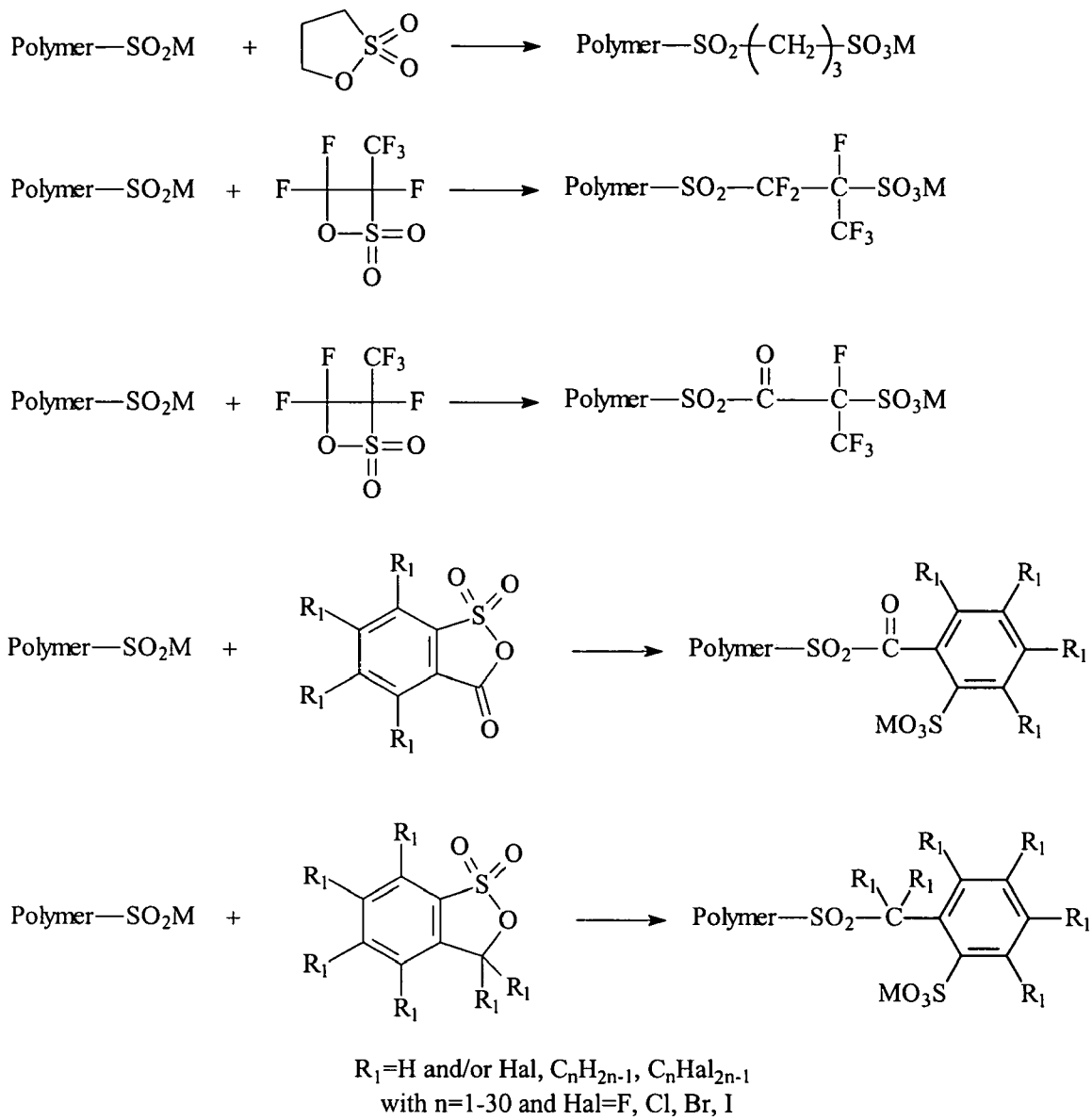
Fig. 2: Modification of polymeric sulfinates via sulfinate alkylation with sultones

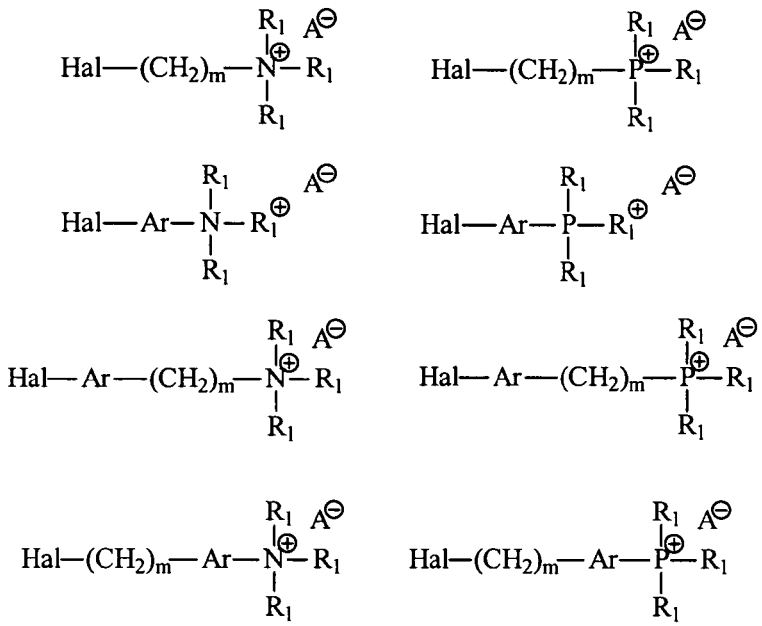
m=1-30, $R_1$=H and/or $C_nH_{2n-1}$,
and/or Aryl, Hetaryl, Phenyl,
with n=1-30 and A=Hal (F, Cl, Br, I), OH, any anion,
Ar=any Arylene radical
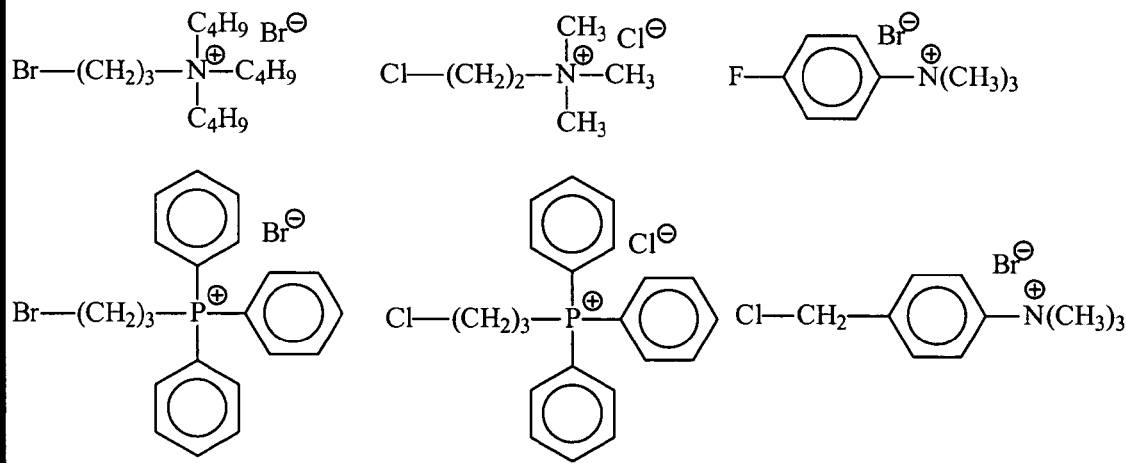
Fig. 3: Alkylation of polymeric sulfinates with halogenalkyl-ammonium- and phosphonium salts

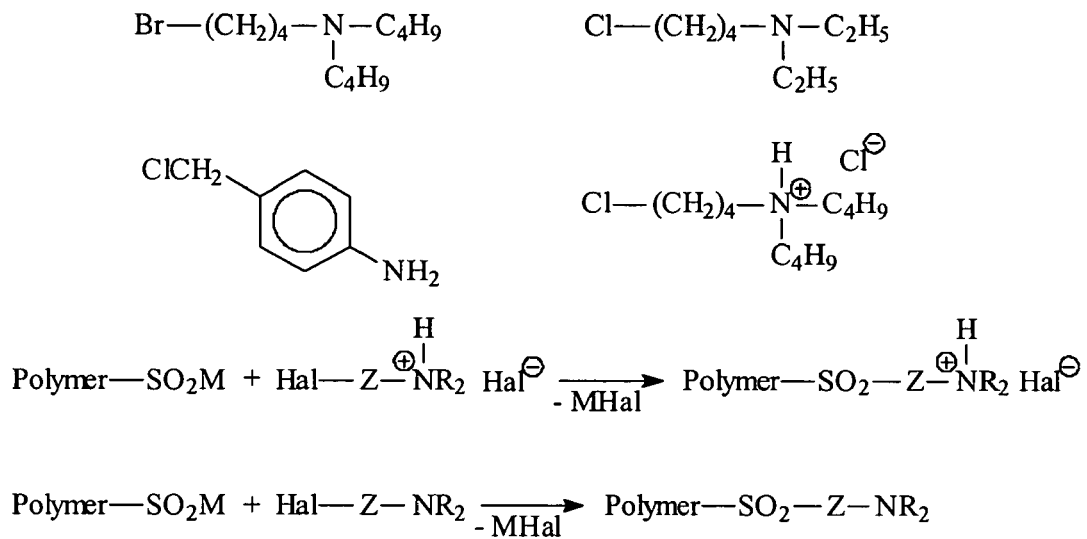
Fig. 4: Alkylation of polymeric sulfinates with halogenealkyl-amines and halogenealkyl-hydrohalogenides (x represents a number between 1 and 20, R represents alkyl, aryl, benzyl, Z represents any intermediate groups such as alkylene, benzyl etc., Hal represents F, Cl, Br, I)

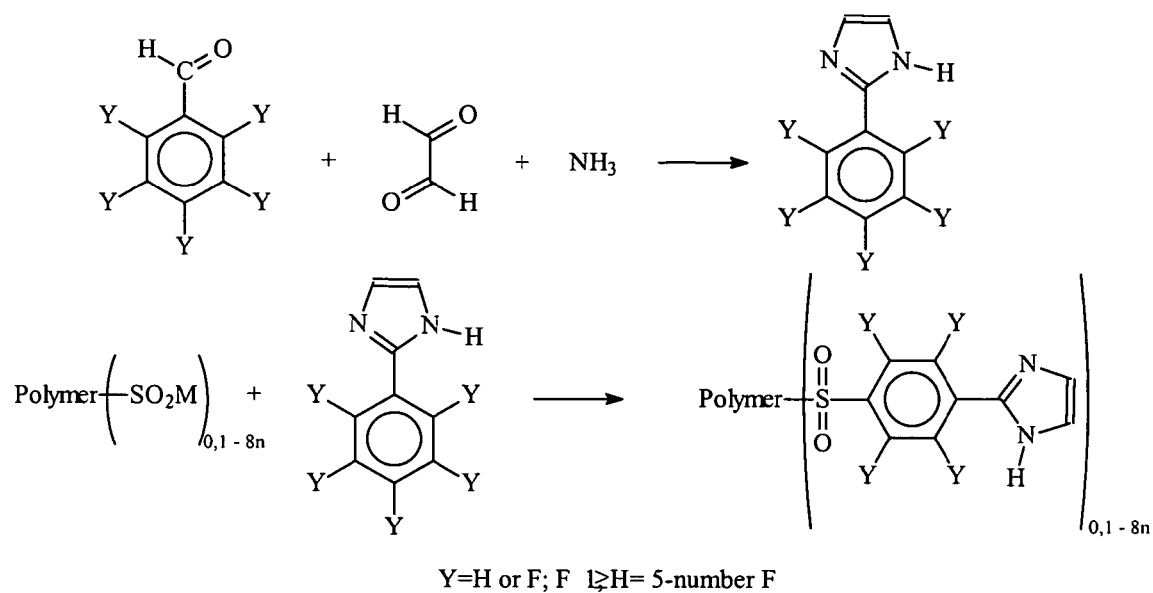
Fig. 4a: Reaction of aromatic fluorinated imidazole with polymeric sulfinates

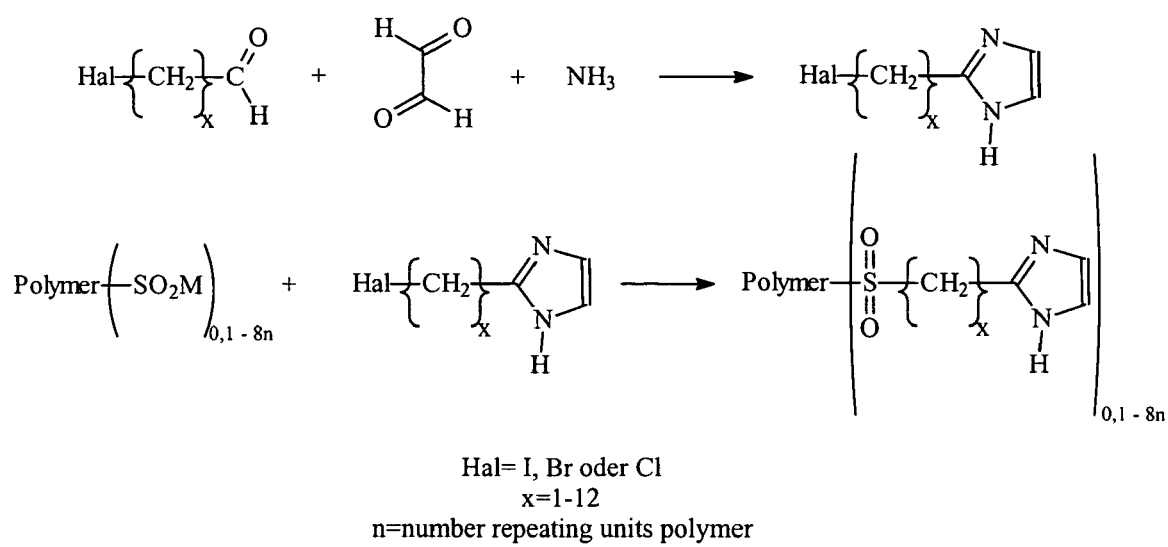
Fig. 4b: Reaction of halogenalkyl-imidazoles with polymeric sulfinates

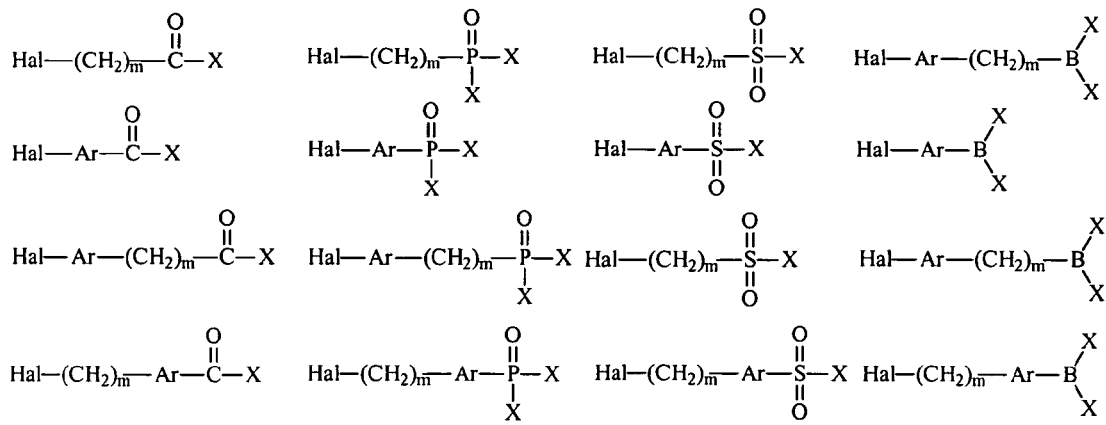

m=1-30, Hal=F, Cl, Br, I
Ar=any arylene radical
X=OM (M=H or any cation), Hal, $OR_1$, $N(R_1)_2$,
with $R_1$=H and/or $C_nH_{2n-1}$, and/or Aryl, Hetaryl, Phenyl, with n=1-30,
$NHR_2$ with $R_2=C_nF_{2n+1}$ and n=1-30,
$NHR_3$ with $R_3=SO_2R_2$:

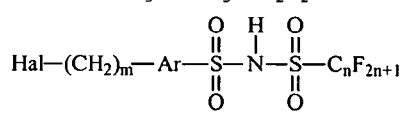

*Examples:*

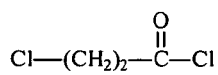 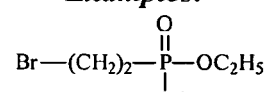 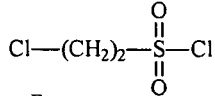

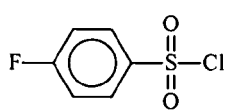 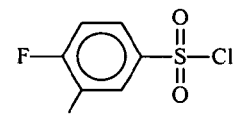 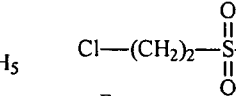

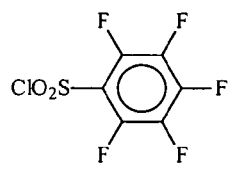 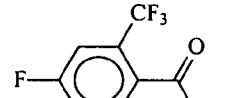 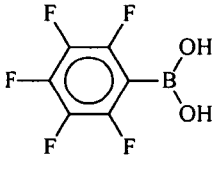

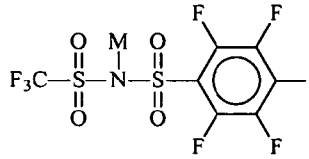  M=H, alkali, earth alkali, any metal cation

Fig. 5a:  S-Alkylation agents for sulfinates with halogenealkyl- or halogenearyl- or halogenebenzyl-sulfonates, -phosponates, -carboxylates or their non-ionic precursors

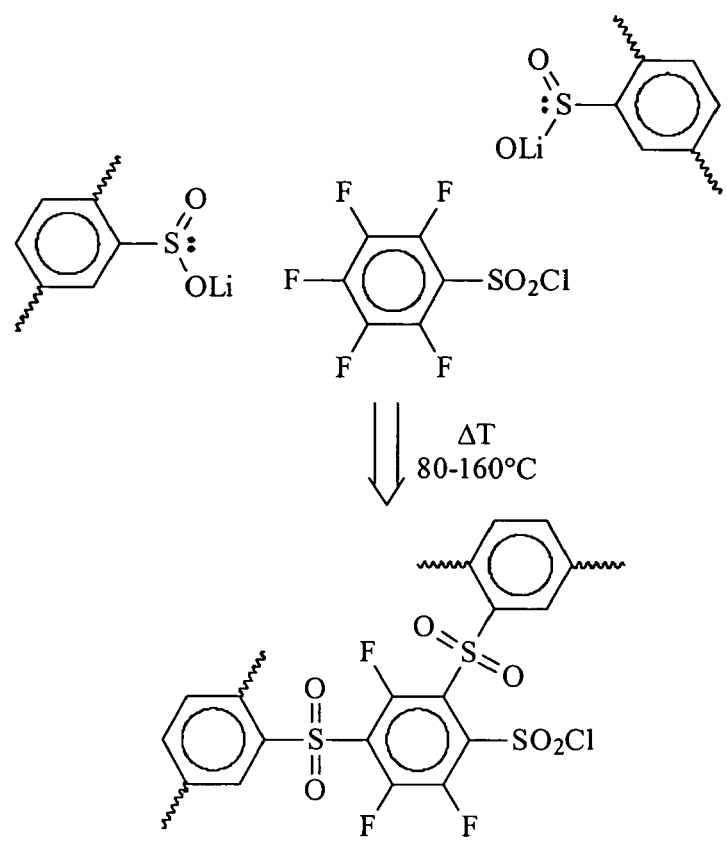
Fig. 5b: Postulated course of the reaction of polymeric sulfinates with pentafluorobenzenesulfochloride

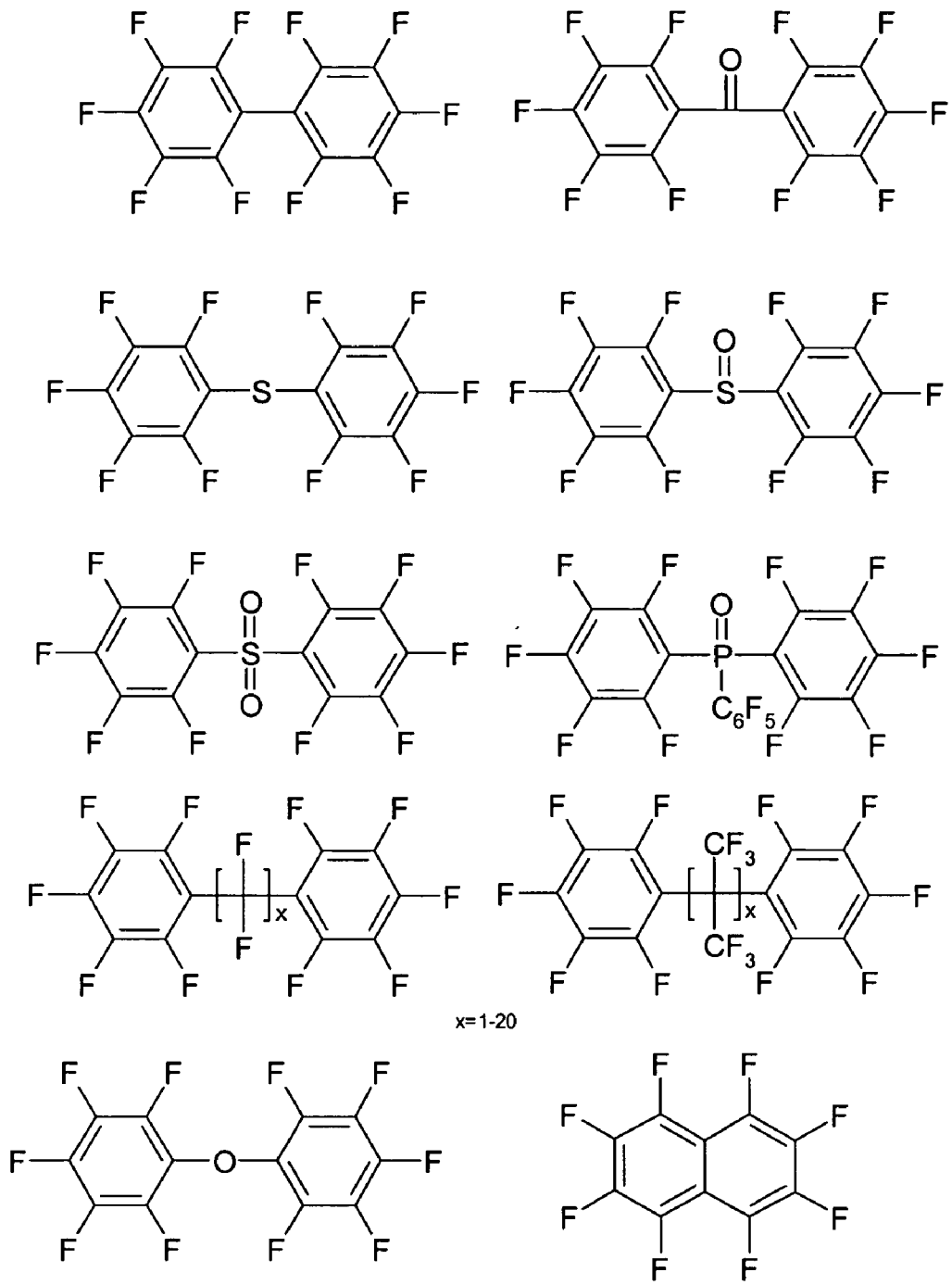
Fig. 5c: Perfluorinated aromatic cross-linking agents

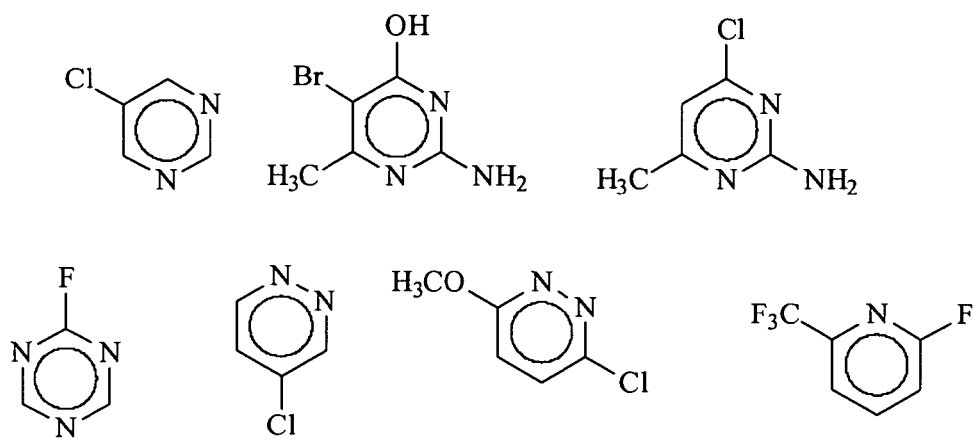
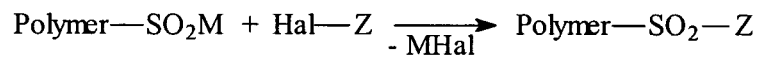
Fig. 6: Alkylation of the sulfinate group of polymeric sulfinates with halogene-hetaryl compounds (Polymer represents any polymer main chain, M represents metal cations such as $Li^+$, $Na^+$, $K^+$, $Rb^+$, $Cs^+$ or ammonium ion, Z represents any hetaryl- or heterocyclic radical)

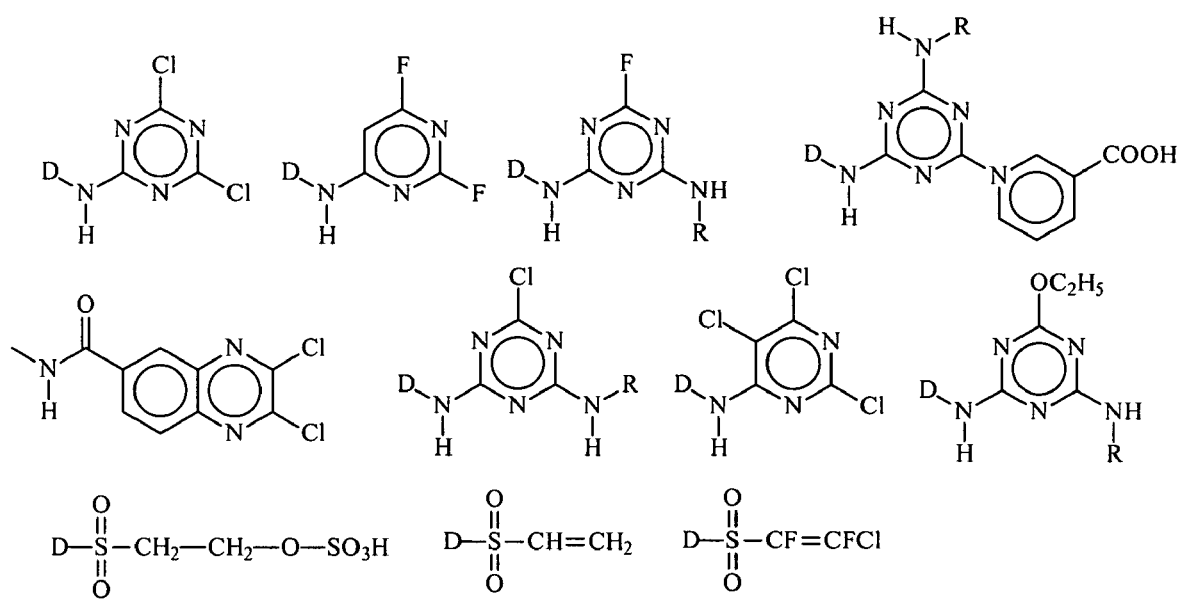
Fig. 7: Reactive groups able to react with sulfinate groups of reactive dyes (D represents dye molecule)

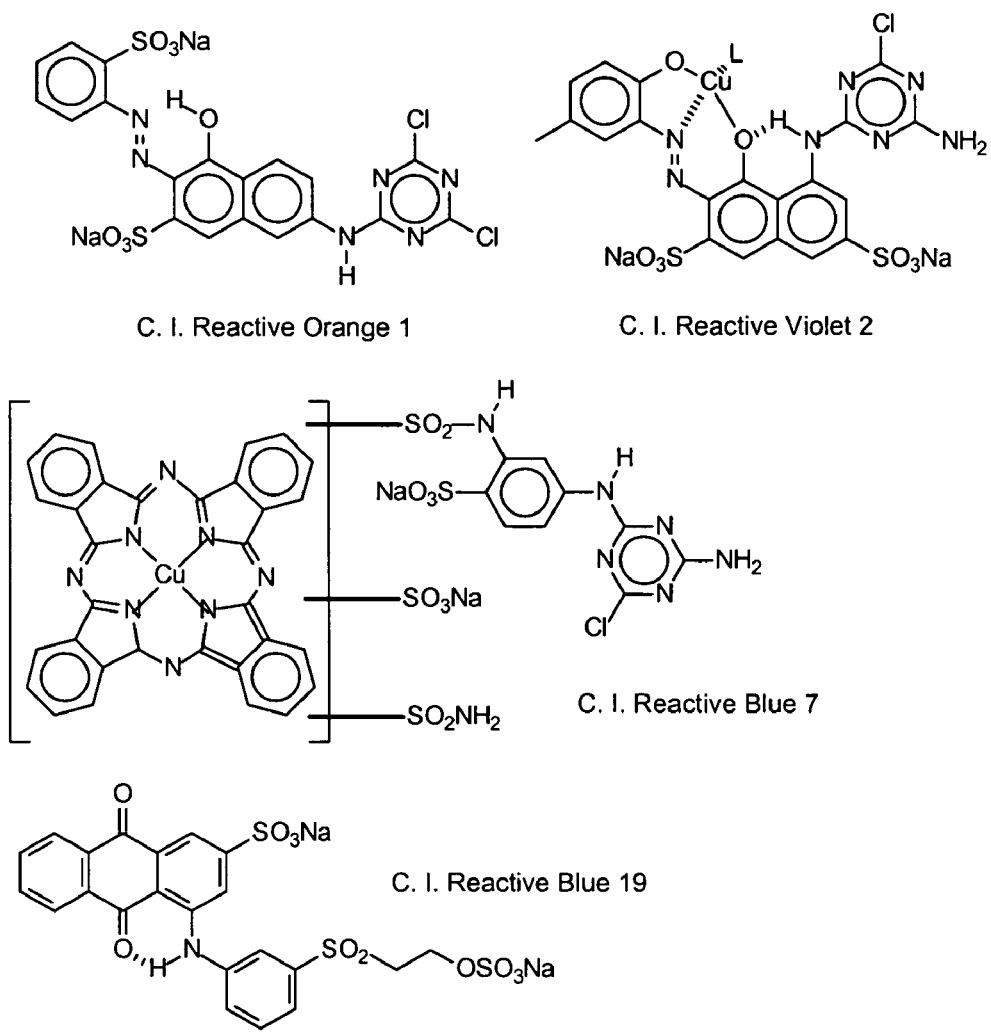
Fig. 8: Selection of reactive dyes reacting with sulfinate groups containing polymers

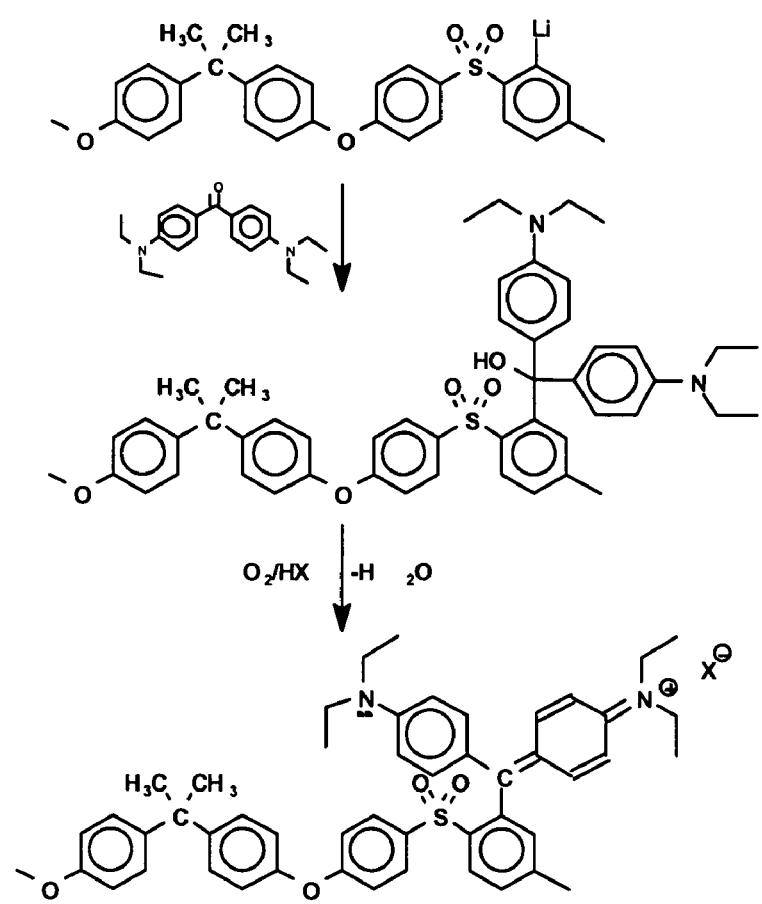
Fig. 9: Introduction of a self-conducting functional group into Polysulfon Udel®

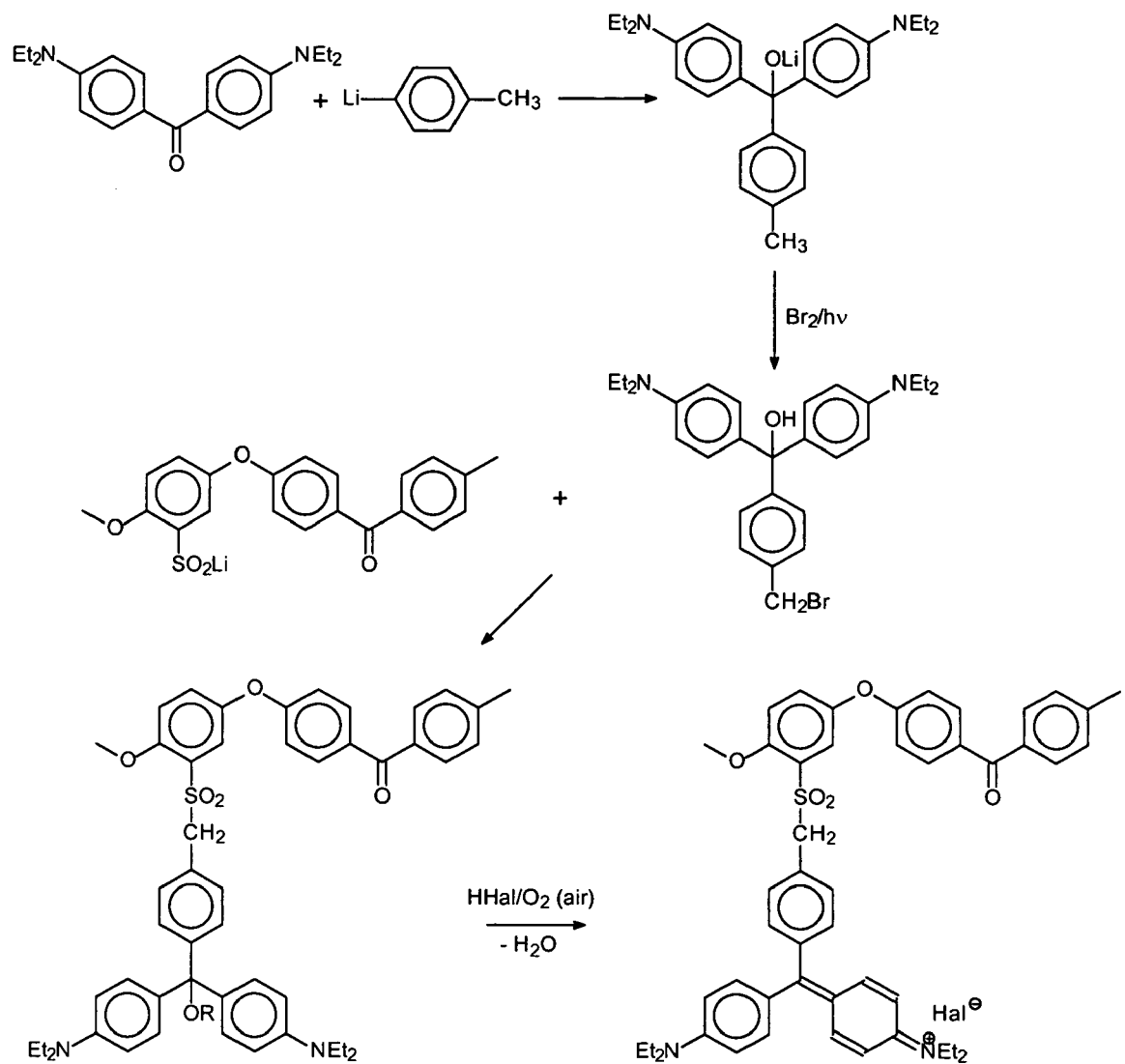
Fig. 10: Introduction of a self-conducting group into sulfinated polyetherketone

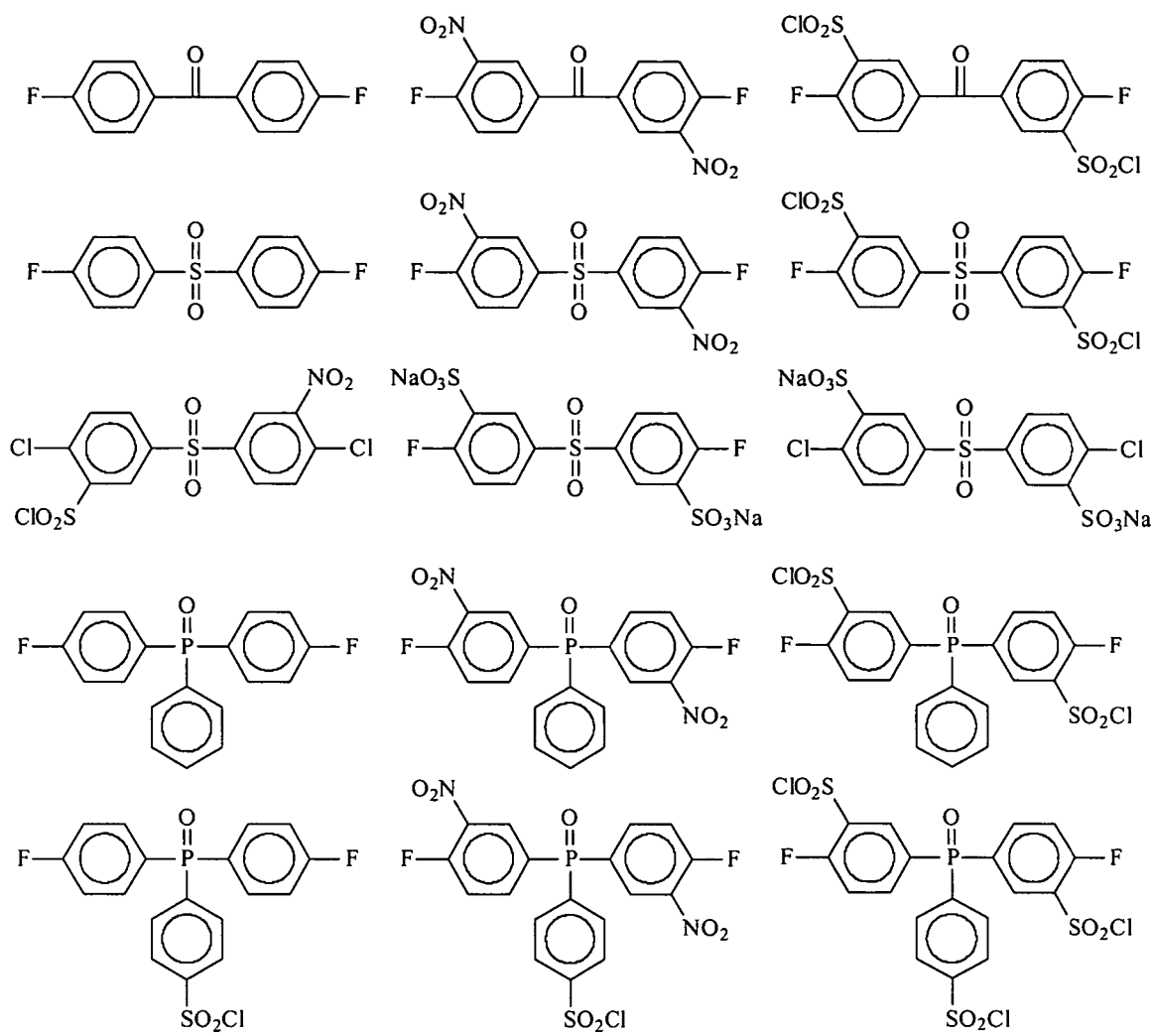
Fig. 11. Examples for cross-linking agents according to the invention

OLIGOMERS AND POLYMERS CONTAINING SULFINATE GROUPS, AND METHOD FOR PRODUCING THE SAME

This is a continuation, of prior application number PCT/DE03/00733 designating the U.S., filed Feb. 28, 2003, which is hereby incorporated herein by reference in its entirety.

SUMMARY

The invention relates to polymers obtained by S-alkylation of sulfinated polymers with alkylation agents, and AB-cross-linked polymers obtained by reacting polymers containing alkylation groups with low-molecular sulfinates, under S-alkylation, or AB-cross-linked polymers obtained by S-alkylation of sulfinated polymers with polymers containing alkylation groups, whereby sulfinated polymers are reacted with alkylation agents (I) wherein R represents alkyl, aryl, or any organic radicals;

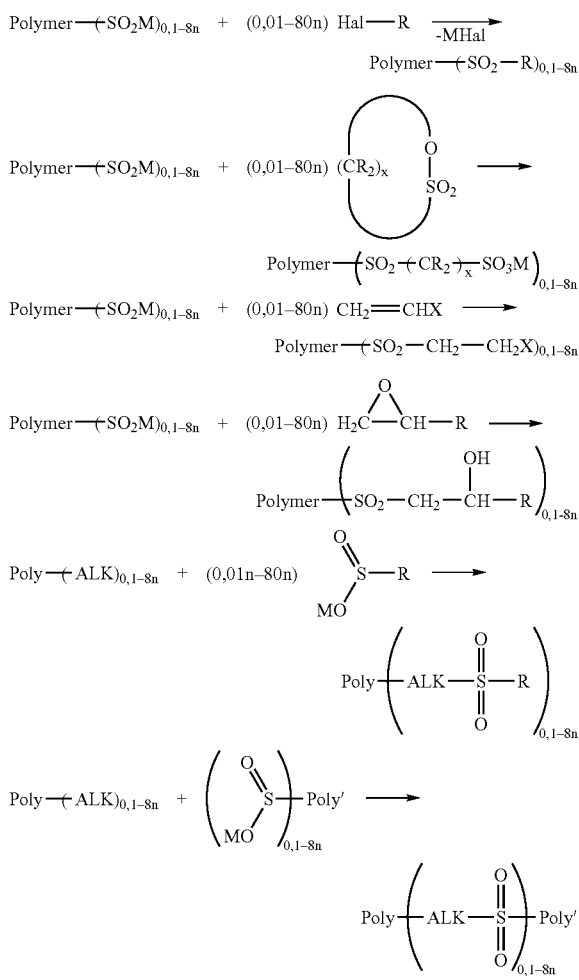

M represents alkali ions or alkaline-earth ions or any monovalent or bivalent metal cation or ammonium cation; ALK represents any alkylation group or polymer; Poly represents any polymer main chain; Hal represents F, Cl, Br or Iodine; x represents a number between 2 and 20; X represents electron-attracting groups and n represents the number of repeat units of the base polymer; and whereby polymers containing alkylation groups are reacted with sulfinated compounds.

The invention also relates to the polymers obtained by reacting sulfinated polymers with mixtures of various monofunctional alkylation agents. Furthermore, the invention relates to polymers obtained by reacting sulfinated polymers with mixtures of monofunctional and difunctional or oligofunctional alkylation reagents (cross-linking agents), in addition to membranes and other moulded bodies. Disclosed are also the polymers obtained by reacting polymers containing alkylation groups with low-molecular or high-molecular sulfinates, whereby mixtures of various sulfinates can also be used.

Finally, the invention relates to methods for producing said sulfinate-alkylated polymers, and for producing membranes and other moulded bodies from said sulfinate-alkylated polymers.

STATE-OF-THE-ART

It is known from the literature, that low-molecular sulfinates can be S- or O-alkylated[1]. Thus the alkylation of sulfinates with methyl iodide with formation of a methyl sulfone has been described. It is known, that polymers containing sulfinate groups can be cross-linked using dihalogen or oligohalogen alkanes by sulfinate-S-alkylation[2,3]. It is also known, that sulfinate groups can be alkylated via nucleophilic aromatic substitution[4]. Furthermore it is known, that sulfinate ions are able to do a Michael-typ-addition on olefines carrying electron-attracting groups[5].

[1] T. Okuyama, Sulfinate ions as nucleophiles, in "The Chemistry of Sulphinic Acids, Esters and their Derivatives (Ed. S. Patai), John Wiley and Sons, 1990, S. 639-664
[2] J. Kerres, W. Zhang, W. Cui, J. Polym. Sci.: Part A: Polym. Chem. 36, 1441-1448 (1998)
[3] Jochen Kerres, Wei Cui, Martin Junginger, J. Memb. Sci. 139, 227-241 (1998)
[4] A. Ulman, E. Urankar, J. Org. Chem. 54, 4691-4692 (1989)
[5] S. Oae, N. Kunieda, in Organic Chemistry of Sulfur (Ed. S. Oae), Plenum, N.Y., 1977, S. 625-637

The introduction of functional groups according to the invention (especially anion exchange groups, cation exchange groups as well as their non-ionic precursors without cross-linking reactions) in polymeric sulfinates via sulfinate alkylation with halogen compounds or with sultones or other electrophilic groups, which react with sulfinate groups, e.g. olefines with electron-attracting groups, using methods according to the invention has not been described so far to our knowledge in the literature.

BRIEF DESCRIPTION OF THE DRAWINGS

The drawings are to a selection of reactions representative of the invention.

DESCRIPTION OF THE INVENTION

Surprisingly it has been found, that sulfinated polymers can be modified versatile via sulfinate-S-alkylation. By means of this reaction functional groups can be introduced in polymers, which can not be introduced by other methods. A selection of the newly-discovered reactions is shown in FIG. 1.

The first set concerns the reaction of sultones with polymeric sulfinates, as shown e.g. in FIG. 2. However in principle there is no limitation for the selection of the sultones. Any sultone can be used. The small ring sultones (4- and 5-rings) are more reactive due to their high ring tension than the big ring-sultones (6-rings and bigger). The highest reactivities are shown by the perfluorinated small-ring sultones such as for the perfluorinated sultone in FIG. 2. Also lactames, lactones and sultames as well as mixed compounds from these components can be reacted with sulfinates.

The second set of reactions is the surprisingly possible alkylation of polymeric sulfinates with halogen aryl-, halogen alkyl- and halogen benzyl- ammonium- and phosphonium salts, as shown e.g. in FIG. 3.

There is in principle no limitation to the selection of the respective ammonium- or phosphonium salt, however preferred are such ammonium- or phosphonium salts, which carry either long alkyl (longer than propyl)- or phenyl groups on the ammonium or phosphonium group, because such salts are better soluble in these organic solvents, in which also the polymeric sulfinates are soluble (dipolar-aprotic solvents such as N,N-dimethylformamide DMF, N-methylformamide, N,N-dimethylacetamide DMAc, N,N-dimethylpyrrolidinone NMP, dimethylsulfoxide DMSO, sulfolane). To further improve the compatibility of the solutions of sulfinated polymers with the ammonium-/phosphonium salts crown ethers can be added to the polymer solution such as 18-crown-6, 15-crown-5 oder 12-crown-4, which coordinate the cation of the sulfinate group. For the halogen leaving group of halogen alkyl or benzyl compounds the following order of reactivity for the alkylation of the sulfinate group has been observed: I>>Br>Cl>>F. For the halogen leaving group of halogen aryl compounds the following order of reactivity for the alkylation of the sulfinate group has been observed: F>>Cl>Br>I.

Surprisingly, a further group of halogen compounds, which react with polymeric sulfinates, are halogenated primary, secondary and tertiary aliphatic, aromatic and/or benzylic amines as well as halogen benzyl amines and their hydrohalogenides, some of these are shown in FIG. 4. Hereby the amino group can be protected with an amino protection group. Especially surprising is also the introduction of imidazole groups according to the invention possible, as shown in FIG. 4a and FIG. 4b. FIG. 4a shows the reaction of fluorinated aryl imidazole derivatives with polymeric sulfinates, whereas in FIG. 4b is shown the reaction of halogen alkyl imidazoles with polymeric sulfinates.

A fourth set of reactions concerns the surprisingly possible S-alkylation of sulfinates with halogen alkyl- or halogen aryl- or halogen benzyl-sulfonates, phosponates, carboxylates, boronates or their non-ionic precursors, somw of which are shown in FIG. 5a.

Hereby are preferred the non-ionic precursors of sulfonates, phosphonates and carboxylates (acid halides, acid esters, acid amides, acid imides, acid anhydrides), because they are better soluble in the organic solvents which are used to dissolve the polymeric sulfinates, and also do not show undesirable interactions with sulfinate groups (such as e.g. formation of ion pairs). If necessary, crown ethers can be added to the sulfinated polymer solutions and the halogen aryl-, halogen alkyl- or halogen benzyl carboxylates, halogen aryl-, halogen alkyl- or halogen benzyl phosphonates or halogen aryl-, halogen alkyl- or halogen benzyl sulfonates or halogen aryl-, halogen alkyl- or halogen benzyl boronates, to complex the cations of the salts.

As already mentioned, amongst the aromatic halogens the aromatic fluorine compounds react best with sulfinates via S-alkylation. It has been found surprisingly, that the addition of calcium compounds to the reaction mixture and/or the after-treatment of the polymers, polymer blends, polymer (blend) membranes or other bodies obtained from the reaction products according to the invention with aqueous solutions of calcium compounds favours the sulfinat-S-alkylation reaction. Presumably the fluoride anions liberated during the S-alkylation are precipitated from the reaction equilibrium by formation of very sparingly soluble calcium fluoride:

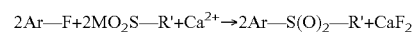

$$2Ar\text{—}F+2MO_2S\text{—}R'+Ca^{2+} \rightarrow 2Ar\text{—}S(O)_2\text{—}R'+CaF_2$$

If the S-alkylation reaction is conducted in organic solvents, calcium compounds are preferred, which are soluble in organic solvents, such as e.g.:
- calcium acetylacetonate (Bis-(2,4-pentanedionato)-calcium)
- calcium-bis-(6,6,7,7,8,8,8-heptafluor-2,2-dimethyl-3,5-octandionate)
- calcium-1,1,1,5,5,5-hexafluoracetylacetonate
- calciummethylate
- calciumoxalate
- calcium-D-gluconate
- calcium-(2,2,6,6-tetramethyl-3,5-heptandionate)
- calciumtriflate (Trifluormethanesulfonic acid calcium salt)

However for some reactions it is sufficient to add to the reaction mixture an in the used solvent sparingly soluble calcium salt, because already small quantities of calcium ions and fluoride ions in the reaction mixture are sufficient to precipitate calcium fluoride. Thus to the reaction mixture can be added inorganic calcium salts: calcium halogenides, calcium sulfate, calcium hydrogensulfate, calcium phosphate and -hydrogenphosphates, calcium oxide, calcium hydroxide and other calcium salts.

It is also wise to post-treat the reaction products of the S-alkylation of sulfinates with aryl fluor compounds with aqueous solutions of calcium salts, on the one hand to complete the S-alkylation reactions and on the other hand to precipitate the toxic fluoride ions liberated during the reaction with calcium ions as $CaF_2$, which is important for an industrial production process.

Surprisingly it has been found, that during the reaction of difluorinated and higher fluorinated aromatic sulfonic acid halides with polymeric sulfinates simultaneously cross-linking reactons take place, because the reaction product is no longer soluble in organic solvents. In FIG. 5B the postulated course of the reaction of a polymeric Li-sulfinate with pentafluorobenzene sulfochloride is shown. The covalently cross-linked ionomer membranes obtained show a surprisingly low ionic resistance at a surprisingly low water up-take (swelling) (see examples). Surprisingly it has been found, that a mixture of:
- low-molecular difluorinated and higher fluorinated aromatic sulfonic acid halides, carbonic acid halides or phosphonic acid halides or other non-ionic precursors of corresponding acids (ester, amides, imides)

and
- low-molecular perfluorinated aromatic compounds as perfluorodiphenylsulfone, perfluorobenzophenone, perfluorotriphenylphosphinoxide, perfluorodiphenyl, perfluorodiphenylether and other perfluorinated aromatic compounds (FIG. 5c) leads via reaction with polymeric or oligomeric sulfinates to cross-linked ionomer membranes with particularly high chemical stability and low swelling also at high temperatures.

Surprisingly it has been found, that also mixtures of polymeric or oligomeric sulfinates with the following low-molecular compounds lead to covalently cross-linked ionomer membranes with a particular advantageous profile of properties:

low-molecular perfluorinated or partly fluorinated precursor of aromatic carbonic acids, phosphonic acids or sulfonic acids or their non-ionic precursor (acid halides, acid amides, acid imides, acid ester)

and dihalogen alkanes $Hal(CH_2)_xHal$ (x=1-20, Hal=I, Br, Cl)

A further, fifth set of compounds, which reacts surprisingly via S-alkylation with polymeric sulfinates, are hetaryl halogen compounds, a selection of which is shown in FIG. 6. In particular it has been found, that by the reaction according to the invention reactive dyes can be bound to sulfinated polymers. In FIG. 7 exemplary reactive groups of dyes are shown, which react with sulfinate groups by S-Alkylation. The order of affinity of (het)aromatic halogen compounds for the S-Alkylation reaction is F>Cl>Br>I. Thereby the reactive groups are not limited to halogen radicals, but can be also protected or unprotected vinylsulfone groups or other unsaturated olefine groups. Olefines with electron-attracting groups (e.g. sulfone groups, sulfonate group, sulfonamide group, sulfonimide group, nitro group, halogen group, nitroso group, carbonyl group, carboxyl group) are preferred.

In FIG. 8 exemplary reactive dyes are shown, which react according to the invention. A field of application of such polymers coloured with reactive dyes is non-linear optics. An advantage of these polymers is, that the dyes are bound permanently by the alkylation reaction according to the invention to the polymer.

In addition it has been found surprisingly, that by the method according to the invention functional groups can be introduced in polymers, into which normally these groups can not be introduced. Thus a functional group can be introduced by a metalation reaction into polymers, which can be metalated and are self-conductive (FIG. 9)[6].

[6] Kerres et al., J. Polym. Sci., Part A: Polym. Chem., 39, 2874-2888 (2001) Until now it was not possible to introduce this group into polymers, which can not be metalalated. A group of polymeres, which can not be metalated, are polyetherketones, because organo metallic compounds as e.g. n-butyllithium would add to the carbonyl function. By the method according to the invention a way is opened to introduce the self-conducting group also into polyetherketones. Thereto the sulfochloride groups of a polymer containing sulfochloride groups are reduced with e.g. sodiumsulfite to sulfinate groups. The sulfinate groups can be alkylated subsequently with a halogen-containing compound, which contains the self-conducting group (FIG. 10).

Furthermore it has been found surprisingly, that polymers containing alkylation groups can be reacted with low-molecular or high-molecular sulfinates by S-alkylation. Examples for alkylation groups according to the invention are (Hal=F, Cl, Br, I):

halogen alkyl groups Hal—Al (Al=aliphatic radical)

halogen aryl groups Hal—Ar halogen benzyl groups Hal—$CH_2$—Ar

Examples for polymers with alkylation groups according to the invention are in particular halogen methylated polymeres (e.g. chlorine methylated polystyrole, bromine methylated polysulfone).

In addition it has been found surprisingly, that also thin films (membranes) or other bodies from sulfinated polymers can be modified by sulfinate-S-alkylation according to the invention, and this either on the surface or in the bulk: if the membrane is swollen in an organic solvent containing also the alkylation agent all sulfinate groups of the membrane/moulded body can be alkylated; in the non-swollen state the membrane/moulded body is modified only on the surface (this comprises also the inner surface of porous membranes). Surprisingly it has been found, that also the inverse case is possible: membranes or other moulded bodies containing alkylation agents are swollen in a suitable organic solvent containing low-molecular or high-molecular sulfinate compounds. The alkylation takes place either on the surface or in the bulk.

Furthermore it has been found surprisingly, that thin films (membranes) or other moulded bodies if neccessary covalently cross-linked can be produced via sulfinate-S-alkylation in one step, by making in a first step the following reaction mixtures:

(1) a sulfinated polymer is dissolved in a suitable organic solvent. Then to the solution an alkylation agent or a mixture of various alkylation agents, whereby the alkylation agents may possess also 2 or more alkylation groups (=cross-linker), is added. At the same time the alkylation agent may possess also further functional groups, e.g. cation exchange groups or their non-ionic precursors or anion exchange groups or their non-ionic precursors.

(2) A polymer containing alkylation groups (e.g. a halogen methylated polymer) is dissolved in a suitable organic solvent. Then to the solution a low-molecular or high-molecular compoud(s) containing one or more sulfinate groups is(are) added. At the same time the sulfinates may possess also further functional groups, e.g. cation exchange groups or their non-ionic precursors or anion exchange groups or their non-ionic precursors.

In a further step the reaction mixtures are cast onto a support (glass metal or polymer plate, textile support, nonwoven) using a doctor knife. Then the solvent is evaporated by a temperature increase and/or application of low pressure. During the solvent evaporation the alkylation reactions take place.

To covalently cross-link the membranes, high-molecular or low-molecular compounds containing 2 or more alkylation groups have to be added to the reaction mixture (1). An example for a high-molecular cross-linker, which can be used according to the invention, is a halogen methylated polymer (chloromethylated polystyrole, bromomethylated polysulfone). Examples for low-molecular cross-linker are shown in FIG. 11. Thereby the cross-linker may possess besides the functional groups to be reacted with the sulfinate groups also further functional groups, e.g. basic or acidic functional groups (FIG. 11) or their non-ionic precursors.

EXAMPLES OF APPLICATION

1. Reaction of Polysulfone-lithiumsulfinate with (3-bromopropyl)trimethylammoniumbromide 10 g 5 wt % PSU-lithiumsulfinate solution (1 sulfinate group per repeat unit) in dimethylsulfoxide DMSO are mixed with 10.179 g of a 5 wt % solution of (3-bromopropyl)trimethylammonumbromide in DMSO under stirring. The mixture is allowed to stand in a closed glass bottle in a drying oven at a temperature of 80° C. for 48 h. Subsequently, the solution is poured into a glass Petri dish, and the solvent is evaporated. Then the film is removed from the Petri dish and post-treated using the following procedure:
24 h at ambient temperature in 10% aqueous NaOH solution
24 h at 60° C. in water

2. Reaction of Polysulfone-lithiumsulfinate with (3-bromopropyl)triphenylphosphoniumbromide 10 g 5 wt % PSU-lithiumsulfinate solution (1 sulfinate group per repeat unit) in dimethylsulfoxide DMSO are mixed with 18.104 g of a 5 wt % solution of (3-bromopropyl)triphenylphosphoniumbromide in DMSO under stirring.

The mixture is allowed to stand in a closed glass bottle in a drying oven at a temperature of 80° C. for 48 h.

Subsequently, the solution is poured into a glass Petri dish, and the solvent is evaporated. Then the film is removed from the Petri dish and post-treated using the following procedure:
24 h at ambient temperature in 10% aqueous NaOH solution
24 h at 60° C. in water

3. Reaction of Polysulfone-lithiumsulfinate with 2-chloromethylbenzimidazole 10 g 5 wt % PSU-lithiumsulfinate solution (1 sulfinate group per repeat unit) in N-methylpyrrolidinone are mixed with 0.325 g 2-chloromethylbenzimidazole in DMSO under stirring. The mixture is allowed to stand in a closed glass bottle in a drying oven at a temperature of 80° C. for 48 h. Subsequently, the solution is poured into a glass Petri dish, and the solvent is evaporated. Then the film is removed from the Petri dish and post-treated using the following procedure:
24 h at ambient temperature in 10% aqueous NaOH solution
24 h at 60° C. in water

4. Reaction of Polysulfone-lithiumsulfinate with Cibacron® Brilliantgelb C. I. 18972

10 g 5 wt % PSU-lithiumsulfinate solution (1 sulfinate group per repeat unit) in dimethylsulfoxide DMSO are mixed with 1.7 g of Cibacron® Brilliantgelb C. I. 18972 under stirring. The mixture is allowed to stand in a closed glass bottle in a drying oven at a temperature of 80° C. for 48 h. Subsequently, the solution is poured into a glass Petri dish, and the solvent is evaporated. Then the film is removed from the Petri dish and post-treated using the following procedure:
24 h at 90° C. in 7% aqueous HCl solution
24 h at 60° C. in water

5. Reaction of Polysulfone-lithiumsulfinate Mit Cibacron® Brilliantrot C. I. 18105

10 g 5 wt % PSU-lithiumsulfinate solution (1 sulfinate group per repeat unit) in dimethylsulfoxide DMSO are mixed with 3.88 g of Cibacron® Brilliantrot C. I. 18105 under stirring. The mixture is allowed to stand in a closed glass bottle in a drying oven at a temperature of 80° C. for 48 h. Subsequently, the solution is poured into a glass Petri dish, and the solvent is evaporated. Then the film is removed from the Petri dish and post-treated using the following procedure:
24 h at 90° C. in 7% aqueous HCl solution
24 h at 60° C. in water

6. Covalently Cross-Linked Anion Exchange Membrane with Quaternary Ammonium Salts 11 g 15 wt % PSU($SO_2Li$)$_2$ solution (2 sulfinate groups per PSU repeat unit) in N-methylpyrrolidinone (NMP) are mixed with 0.51 g (3-bromopropyl)trimethylammoniumbromide and stirred under slight heating until dissolution of the salt. Then 0.38 ml 1,4-diiodobutane (cross-linking agent) is added and further 5 g NMP. The reaction mixture is cast onto a glass plate using a doctor knife and the solvent is evaporated in a vacuum drying oven at 140-150° C. and first 700 mbar, then <10 mbar pressure. During the membrane formation, the alkylation reactions take place. Then the membrane is removed under water and post-treated as follows:
48 h at ambient temperature up to 90° C. in 1N NaOH
48 h at ambient temperature up to 60° C. in water

7. Covalently Cross-Linked Anion Exchange Membrane with Quaternary Phosphonium Salts 9.94 g 15 wt % PSU($SO_2Li$)$_2$ solution (2 sulfinate groups per PSU repeat unit) in N-methylpyrrolidinone (NMP) are mixed with 1.026 g (3-bromopropyl)triphenylphosphoniumbromide and stirred under slight heating until dissolution of the low-molecular salt. Then 0.34 ml 1,4-diiodobutane (cross-linking agent) is added and further 5 g NMP. The reaction mixture is cast onto a glass plate using a doctor knife and the solvent is evaporated in a vacuum drying oven at 140-150° C. and first 700 mbar, then <10 mbar pressure. During the membrane formation, the alkylation reactions take place. Then the membrane is removed under water and post-treated as follows:
48 h at ambient temperature up to 90° C. in 1N NaOH
48 h at ambient temperature up to 60° C. in water

8. Covalently Cross-linked Cation Exchange Membrane from PSU-sulfinate and (2-Bromomethyl)Sulfonic Acid Na-salt 6.67 g 15 wt % i PSU($SO_2Li$)$_2$ solution. (2 sulfinate groups per PSU repeat unit) in N-methylpyrrolidinone (NMP) are mixed with 0.38 g (2-bromomethyl)sulfonic acid Na-salt and stirred under slight heating until dissolution of the low-molecular salt. Then 0.05 ml 1,4-diiodobutane (cross-linking agent) is added and further 8 g NMP. The reaction mixture is cast onto a glass plate using a doctor knife and the solvent is evaporated in a vacuum drying oven at 140-150° C. and first 700 mbar, then <10 mbar pressure. During the membrane formation, the alkylation reactions take place. Then the membrane is removed under water and post-treated as follows:
48 h at ambient temperature up to 90° C. in 10% HCl
48 h at ambient temperature up to 60° C. in water

9. Covalently Cross-linked Cation Exchange Membrane from PSU-sulfinate and (2-Chloroethane) Sulfonic Acid Halide 6.67 g 15 wt % i PSU($SO_2Li$)$_2$ solution (2 sulfinate groups per PSU repeat unit) in N-methylpyrrolidinone (NMP) are mixed with 0.545 g (2-chloroethane) sulfonic acid halide and stirred under slight heating until dissolution of the low-molecular acid halide. Then 0.05 ml 1,4-diiodobutane (cross-linking agent) is added and further 8 g NMP. The reaction mixture is cast onto a glass plate using a doctor knife and the solvent is evaporated in a vacuum drying oven at 140-150° C. and first 700 mbar, then <10 mbar pressure. During the membrane formation, the alkylation reactions take place. Then the membrane is removed under water and post-treated as follows, during which the acid halide is hydrolysed to the sulfonic acid:
48 h at ambient temperature up to 90° C. in 10% HCl
48 h at ambient temperature up to 60° C. in water

10. Covalently Cross-linked Cation Exchange Membrane from PSU-sulfinate and (2-Bromomethane)Phosphonic Acid Diethylester 6.67 g 15 wt % PSU($SO_2Li$)$_2$ solution (2 sulfinate groups per PSU repeat unit) in N-methylpyrrolidinone (NMP) are mixed with 0.819 g (2-bromomethane)phosphonic acid diethylester stirred under slight heating until dissolution of the low-molecular ester. Then 0.05 ml 1,4-diiodobutane (cross-linking agent) is added. The reaction mixture is cast onto a glass plate using a doctor knife and the solvent is evaporated in a vacuum drying oven at 140-150° C. and first 700 mbar, then <10 mbar pressure. During the membrane formation, the alkylation reactions take place. Then the membrane is removed under water and post-treated as follows, during which the phosphonic acid ester is hydrolysed to the phosphonic acid:
48 h at ambient temperature up to 90° C. in 10% NaOH
48 h at ambient temperature up to 90° C. in 1N HCl
48 h at ambient temperature up to 60° C. in water

11. Ionomer Membrane with 4-fluorobenzene Sulfochloride and Calciumtriflate 3 g RadelR($SO_2Li$)$_2$ are dissolved in 17 g NMP. Then to the solution is added first 1.184 g calciumtrifluoromethansulfonate (calciumtriflate), then 3.32 g 4-fluorobenzene sulfochloride. It is stirred, until a clear solution is obtained. The start of the nucleophilic aromatic substitution reaction is recognized at the increasing viscosity of the polymer solution. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
24 h at ambient temperature up to 90° C. in 10% NaOH
48 h at ambient temperature up to 90° C. in 1N HCl
48 h at ambient temperature up to 90° C. in water

12. Ionomer Blend Membrane with Pentafluorobenzene Sulfochloride (Membran 1296)

The following polymers are dissolved in NMP for a 15 wt % solution:
2.258 g PSU($SO_2Li$)$_2$
0.828 g Radel R($SO_2Li$)$_1$
1.805 g sPEKCl (IEC=3.49 meq $SO_3H$/g after hydrolysis)
1.335 g sPEEKCl (IEC=1.8 meq $SO_3H$/g after hydrolysis)

Then 1.843 g pentafluorobenzene sulfochloride is added to the polymer solution. It is stirred until homogenisation. Then to the solution is added 0.75 g bis(4-fluorophenyl)sulfone and dissolved within. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
24 h at ambient temperature up to 90° C. in 10% NaOH
48 h at ambient temperature up to 90° C. in 1N HCl
48 h at ambient temperature up to 90° C. in water Thereby also post-treatment steps can be left out or the order of the post-treatment steps can be altered.

Instead of pentafluorobenzene sulfochloride also other fluorinated fluorobenzene sulfochlorides or fluorobenzoylchlorides can be used in equimolar quantities or in excess for the reaction, such as difluorobenzene sulfochlorides, trifluorobenzene sulfochlorides and tetrafluorobenzene sulfochlorides. Also further addition of other cross-linking agents is possible, such as bis(3-nitro-4-fluorophenyl)sulfone, bis(4-fluorophenyl)phenylphosphinoxide or corresponding cross-linking agents with additional sulfohalide groups (bis(3-chlorosulfo-4-fluorophenyl)sulfone. Also the addition of dihalogenoalkanes or benzylhalogens is possible.

Characterisation results:
IEC (meq $SO_3H$/g): 1.52
$R_{sp}^{H+}$, 0.5N HCl ($\Omega$*cm): 13.33
SW 25° C. (%): 108.6
SW 90° C. (%): 190

13. Ionomer Membranes with Different Fluorinated Benzene Sulfochlorides

A polymeric sulfinate (see table 1) is dissolved in NMP. Then a fluorobenzene sulfochloride or a fluorobenzoylchloride (see table 1) is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
24 h at ambient temperature up to 90° C. in 10% NaOH
48 h at ambient temperature up to 90° C. in 1N HCl
48 h at ambient temperature up to 90° C. in water Thereby also post-treatment steps can be left out or the order of the post-treatment steps can be altered.

TABLE 1

| | Data for Example 13 | | | |
|---|---|---|---|---|
| Typ polymeric sulfinate | Number $SO_2Li$ pro RU[a] | Quantity sulfinate [g] | Typ Acidchloride | Quantity Acidchloride [g] |
| PSU[b]-Sulfinat | 1.3 | 3 | 4-Fluorobenzene sulfochloride | 2.85 |
| " | 1.3 | 3 | 2,6-Difluorobenzene sulfochloride | 3.06 |
| " | 1.3 | 3 | 2,3,4-Trifluorobenzene sulfochloride | 3.32 |
| " | 1.3 | 3 | 2,3,4,5-Tetrafluorobenzene sulfochloride | 3.58 |
| " | 1.3 | 3 | Pentafluorobenzene sulfochloride | 3.84 |
| Radel R[c]-sulfinate | 1 | 3 | Pentafluorobenzene sulfochloride | 3.12 |
| PEEK($SO_2Li$)$_{0.5}$($SO_3Li$)$_{0.5}$[d] | 0.5 | 3 | Pentafluorobenzene sulfochloride | 2.24 |
| PSU-sulfinate | 2 | 3 | Pentafluorobenzoylchloride | 4.7 |

[a]Repeat unit
[b]Polysulfon Udel (producer BP Amoco)
[c]Polyphenylsulfon Radel R (producer BP Amoco)
[d]Poly(etheretherketon) (producer Victrex)

14. Ionomer Membranes with Fluorinated Pentafluorobenzene Sulfochloride and Additional Cross-Linking Agent 3 g polymeric sulfinate (see table 2) is dissolved in NMP. Then 1.95 g pentafluorobenzene sulfochloride (see table 2) is added. Then an aromatic cross-linking agent is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
24 h at ambient temperature up to 90° C. in 10% NaOH
48 h at ambient temperature up to 90° C. in 1N HCl
48 h at ambient temperature up to 90° C. in water Thereby also post-treatment steps can be left out or the order of the post-treatment steps can be altered.

TABLE 2

Data for Example 14

| Typ polymeric sulfinate | Number $SO_2Li$ per RU[a] | Typ cross-linking agent | Quantity cross-linking agent [g] |
|---|---|---|---|
| PSU[b]-sulfinate | 1.3 | Bis(3-nitro-4-fluorophenyl)sulfone | 0.935 |
| " | 1.3 | Bis(3-sulfochloro-4-fluorophenyl)sulfone | 1.22 |
| " | 1.3 | Bis(4-fluorophenyl)phenylphosphinoxide | 0.85 |
| " | 1.3 | Bis(4-fluorophenyl)sulfone | 0.69 |

[a]Wiederholungseinheit
[b]Polysulfon Udel (Hersteller BP Amoco)

Surprisingly it has been found, that the further addition of a calcium salt to the reaction mixture in equimolar amounts related to sulfinate groups further accelerates the reaction, presumably by removal of the fluoride ions which form during the nucleophilic substitution reaction as precipitated calcium fluoride. If calcium fluoride is formed, it would remain in side the membrane matrix which leads to a higher thermal resistance and mechanical stability of the membranes. A calcium salt, which can be used in the reactions of examples 13 and 14, is calcium trifluorosulfonate (calcium triflate), because this salt is soluble in NMP and other dipolar-aprotic solvents.

15. Ionomer Membrane with Pentafluorobenzene Sulfochloride (Membran 1289)

3 g $PSU(SO_2Li)_2$ is dissolved in NMP. Then 2.5 g pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
48 h at ambient temperature up to 90° C. in 1N HCl
48 h at ambient temperature up to 90° C. in water
Characterisation Results:

| | |
|---|---|
| IEC (meq $SO_3H/g$): | 0.89 |
| $R_{sp}^{H+}$, 0.5N HCl (Ω * cm): | 38.05 |
| SW 25° C. (%): | 24.6 |
| SW 90° C. (%): | 32.6 |

16. Ionomer Membrane with 2,6-difluorobenzene Sulfochloride (Membran 1297)

3 g $PSU(SO_2-Li)_{1.3}$ is dissolved in NMP. Then 3.06 g 2,6-difluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
48 h at ambient temperature up to 90° C. in 1N HCl
48 h at ambient temperature up to 90° C. in water
Characterisation Results:

| | |
|---|---|
| IEC (meq $SO_3H/g$): | 0.29 |
| $R_{sp}^{H+}$, 0.5N HCl (Ω * cm): | 67.8 |
| SW 25° C. (%): | 13.8 |
| SW 90° C. (%): | 25.5 |

17. Ionomer Membrane with 2,3,4-trifluorobenzene Sulfochloride (Membran 1298)

3 g $PSU(SO_2Li)_{1.3}$ is dissolved in NMP. Then 3.32 g 2,3,4-trifluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% $CaCl_2$
48 h at ambient temperature up to 90° C. in 1N HCl
48 h at ambient temperature up to 90° C. in water
Characterisation Results:

| | |
|---|---|
| IEC (meq $SO_3H/g$): | 0.10 |
| $R_{sp}^{H+}$, 0.5N HCl (Ω * cm): | 21.8 |
| SW 25° C. (%): | 14.8 |
| SW 90° C. (%): | 45.6 |

18. Ionomer Membrane with Pentafluorobenzene Sulfochloride (Membran 1299)

3 g $PSU(SO_2Li)_{1.3}$ is dissolved in NMP. Then 1.92 g pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows: 24 h at ambient temperature up to 90° C. in 10% $CaCl_2$
48 h at ambient temperature up to 90° C. in 1N HCl
48 h at ambient temperature up to 90° C. in Wasser
Characterisation Results:

| | |
|---|---|
| IEC (meq $SO_3H/g$): | 0.99 |
| $R_{sp}^{H+}$, 0.5N HCl (Ω * cm): | 26.1 |
| SW 25° C. (%): | 14.8 |
| SW 90° C. (%): | 44 |

19. Ionomer Membrane with Pentafluorobenzene Sulfochloride (Membran 1300)

3 g $PSU(SO_2Li)_{1.3}$ is dissolved in NMP. Then 1.92 g pentafluorobenzene sulfochloride is added followed by 1.184 g calciumtrifluorsulfonate. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in Wasser
Characterisation Results:

| | |
|---|---|
| IEC (meq SO$_3$H/g): | 1.01 |
| R$_{sp}^{H+}$, 0.5N HCl (Ω * cm): | 12.2 |
| SW 25° C. (%): | 27 |
| SW 90° C. (%): | 69.6 |

20. Ionomer Membrane with Pentafluorobenzene Sulfochloride (Membran 1301)

3 g PSU(SO$_2$Li)$_{1.3}$ is dissolved in NMP. Then 3.84 g pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water
Characterisation Results:

| | |
|---|---|
| IEC (meq SO$_3$H/g): | 1.25 |
| R$_{sp}^{H+}$, 0.5N HCl (Ω * cm): | 8.3 |
| SW 25° C. (%): | 41.4 |
| SW 90° C. (%): | 136 |

21. Ionomer Membrane with Pentafluorobenzene Sulfochloride (Membran 1302)

2.693 g PSU(SO$_2$Li)$_{1.3}$ is dissolved in NMP. Then 3.45 g pentafluorobenzene sulfochloride is added followed by 0.5 g bis(3-nitro-4-fluorphenyl)sulfone. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water
Characterisation Results:

| | |
|---|---|
| IEC (meq SO$_3$H/g): | 1.16 |
| R$_{sp}^{H+}$, 0.5N HCl (Ω * cm): | 7.5 |
| SW 25° C. (%): | 30.8 |
| SW 90° C. (%): | 207.8 |

22. Ionomer Membrane with Pentafluorobenzene Sulfochloride (Membran 1307)

2.822 g RadelR(SO$_2$Li)$_1$ is dissolved in NMP. Then 1.79 g pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water
Characterisation Results:

| | |
|---|---|
| IEC (meq SO$_3$H/g): | |
| R$_{sp}^{H+}$, 0.5N HCl (Ω * cm): | 36.8 |
| SW 25° C. (%): | |
| SW 90° C. (%): | |

23. Ionomer Membrane with Pentafluorobenzene Sulfochloride (Membran 1309)

3 g RadelR(SO$_2$Li)$_2$ is dissolved in NMP. Then 2 ml pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water
Characterisation Results:

| | |
|---|---|
| IEC (meq SO$_3$H/g): | |
| R$_{sp}^{H+}$, 0.5N HCl (Ω * cm): | |
| SW 25° C. (%): | |
| SW 90° C. (%): | |

24. Ionomer Membrane with Pentafluorobenzene Sulochloride (Membran 1310)

3 g PEEK(SO$_2$Li)$_{0.5}$(SO$_3$Li)$_{0.5}$ is dissolved in NMP. Then 0.5 ml pentafluorobenzene sulfochloride is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water
Characterisation Results:
IEC (meq SO$_3$H/g):
R$_{sp}^{H+}$, 0.5N HCl (Ω*cm):
SW 25° C. (%):
SW 90° C. (%):

25. Ionomer Membrane with Pentafluorobenzene Sulfochloride (Membran 1312)

4 g RadelR(SO$_2$Li)$_2$ is dissolved in NMP. Then 2.2 g pentafluorobenzene sulfochloride is added followed by 1.337 g decafluorobenzophenone. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h at ambient temperature up to 90° C. in 10% CaCl$_2$
48 h at ambient temperature up to 90° C. in 1N HCl
48 h at ambient temperature up to 90° C. in water Characterisation Results:
IEC (meq SO$_3$H/g):
R$_{sp}^{H+}$, 0.5N HCl (Ω*cm):
SW 25° C. (%):
SW 90° C. (%):

26 Ionomer Membrane with
Decafluorobenzophenone (Membran 1313)

4.486 g PEEK(SO$_2$Li)$_{0.5}$(SO$_3$Li)$_{0.5}$ is dissolved in NMP. Then 0.235 g decafluorobenzophenone is added. It is stirred until homogenisation. The solution is cast onto a glass plate using a doctor knife and the solvent is evaporated at 130-140° C. and 700 mbar to 1 mbar. Then the membrane is removed under water and post-treated as follows:
24 h bei RT-90° C. in 10% CaCl$_2$
48 h bei RT-90° C. in 1N HCl
48 h bei RT-90° C. in Wasser
Characterisation Results:
IEC (meq SO$_3$H/g):
R$_{sp}^{H+}$, 0.5N HCl (Ω*cm):
SW 25° C. (%):
SW 90° C. (%):

The polymer of the invention has repeat units corresponding to the general formulae (1A), (1B), (1C), (1D), (1E), (1F), (1G), (1H), (1I), (1T), (1K), (1L), (1M), (1N), (1O), (1P), (1Q), (1N), (1O), (1P), (1Q), (1R), (1S) and/or (1T):

$$\text{—O—R}^6\text{—} \tag{1A}$$

$$\text{—S—R}^6\text{—} \tag{1B}$$

$$\text{—O—R}^6\text{—SO}_2\text{—R}^6\text{—} \tag{1C}$$

$$\text{—O—R}^6\text{—SO}_2\text{—R}^6\text{—O—R}^6\text{—} \tag{1D}$$

$$\text{—O—R}^6\text{—SO}_2\text{—R}^6\text{—O—R}^6\text{—R}^6\text{—} \tag{1E}$$

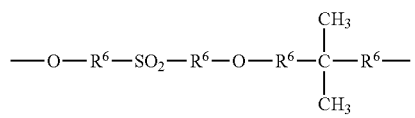
(1F)

$$\text{—O—R}^6\text{—SO}_2\text{—R}^6\text{—R}^6\text{—SO}_2\text{—R}^6\text{—} \tag{1G}$$

$$\text{—O—R}^6\text{—SO}_2\text{—R}^6\text{—R}^6\text{—SO}_2\text{—R}^6\text{—O—R}^6\text{—SO}_2\text{—R}^6\text{—} \tag{1H}$$

$$\text{—}[\text{O—R}^6\text{—SO}_2\text{—R}^6]_x\text{—}[\text{SO}_2\text{—R}^6\text{—R}^6]_y\text{—} \tag{1I}$$

with 0<X, Y<100%
based on the number of all repeat units $$\text{—O—R}^6\text{—CO—R}^6\text{—} \tag{1J}$$

$$\text{—O—R}^6\text{—CO—R}^6\text{—CO—R}^6\text{—} \tag{1K}$$

$$\text{—O—R}^6\text{—CO—R}^6\text{—O—R}^6\text{—CO—R}^6\text{—CO—R}^6\text{—} \tag{1L}$$

$$\text{—O—R}^6\text{—O—R}^6\text{—CO—R}^6\text{—} \tag{1M}$$

$$\text{—O—R}^6\text{—O—R}^6\text{—CO—R}^6\text{—CO—R}^6\text{—} \tag{1N}$$

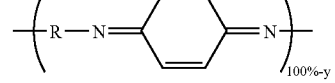
(1O)

mit 0 < y < 100%
with 0 < X, Y < 100%

$$\text{—R}^6\text{—} \tag{1P}$$

$$\text{—R}^6\text{—CH}\text{=}\text{CH—} \tag{1Q}$$

$$\text{—CHR}^7\text{—CH}_2\text{—} \tag{1R}$$

(1S)

(1T)

Independently of one another here the radicals R$^6$ which are identical or different, are 1,2-phenylene, 1,3-phenylene, 1,4-phenylene, 4,4'-biphenyl, a divalent radical of a heteroaromatic, a divalent radical of a C$_{10}$ aromatic, a divalent radical of a C$_{14}$ aromatic and/or a divalent pyrene radical. An example of a C$_{10}$ aromatic is naphthalene; of a C$_{14}$ aromatic, phenanthrene. The substitution pattern of the aromatic and/or heteroaromatic is arbitrary, in the case of phenylene, for example, R$^6$ may be ortho-, meta- and para-phenylene.

The radicals R$^7$, R$^8$ and R$^9$ designate monovalent, tetravalent and trivalent aromatic or heteroaromatic groups, respectively, and the radicals U, which are identical within a repeat unit, are an oxygen atom, a sulfur atom or an amino group which carries a hydrogen atom, a group having 1-20 carbon atoms, preferably a branched or unbranched alkyl or alkoxy group, or an aryl group as a further radical.

The polymers with repeat units of the general formula (1) that are particularly preferred in the context of the present invention include homopolymers and copolymers, examples being random copolymers, such as ®Victrex 720 P and ®Astrel. Especially preferred polymers are polyaryl ethers, polyaryl thioethers, polysulfones, polyether ketones, polypyrroles, polythiophenes, polyazoles, phenylenes, polyphenylenevinylenes, polyanilines, polyazulenes, polycarbazoles, polypyrenes, polyindophenines and polyvinylpyridines, especially polyaryl ethers:

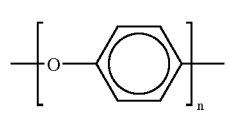

Polyphenylenoxid (1A-1)

-continued
Polyarylthioether:
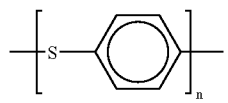
(1B-1)
Polyphenylensulfid
Polysulfone:
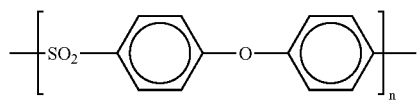
(1C-1)
®Victrex 200 P
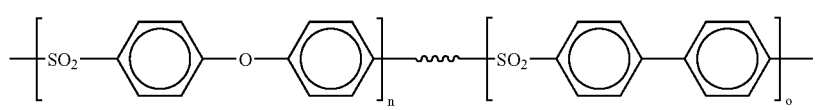
(1I-1)
®Victrex 720 P
mit n > o
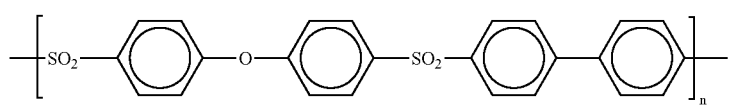
(1G-1)
®Radel
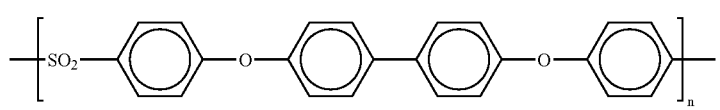
(1E-1)
®Radel R
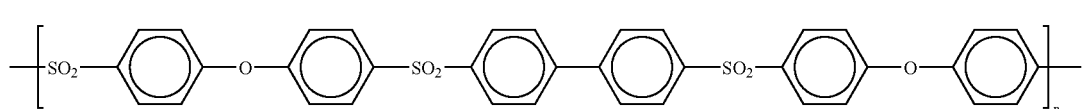
(1H-1)
®Victrex HTA
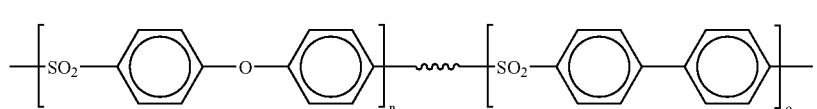
(1I-2)
®Astrel
with n < o
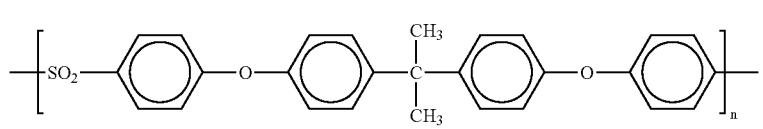
(1F-1)
®Udel
Polyetherketone:
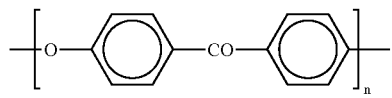
(1J-1)
PEK
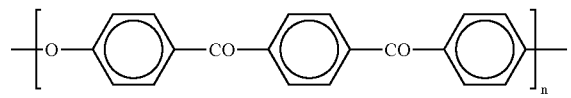
(1K-1)
PEKK -continued
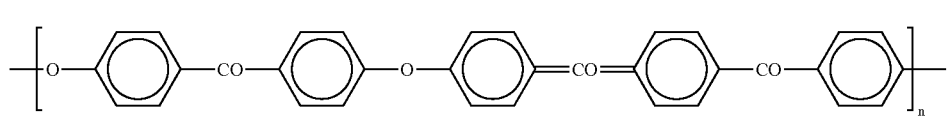
PEKEKK (1L-1)
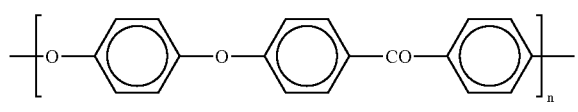
PEEK (1M-1)
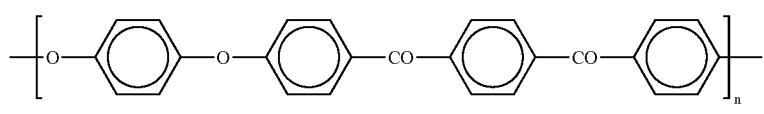
PEEKK (1N-1)
Polypyrrole:
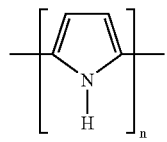
(1P-1)
Polythiophene:
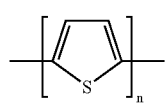
(1P-2)
Polyazole:
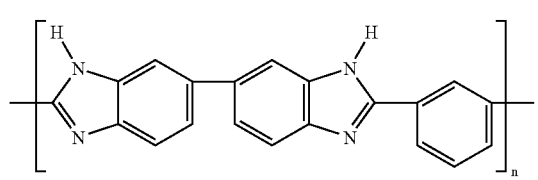
Polybenzimidazol (1S-1)
Polyphenylene:
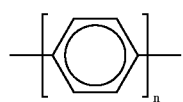
(1P-3)
Polyphenylenvinylen:
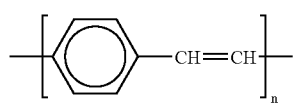
(1Q-1)
Polyanilin:
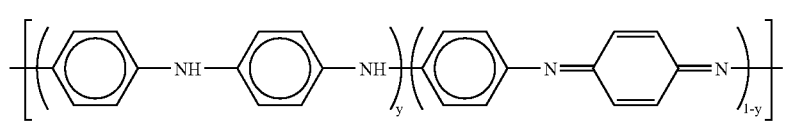
(1O-1)
Polyazulen:

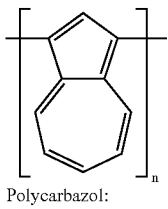
Polycarbazol:

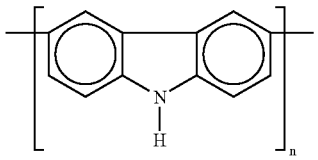
Polypyren:

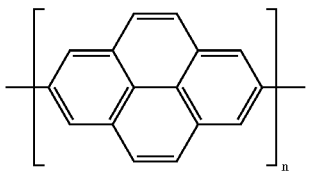
Polyindophenine:

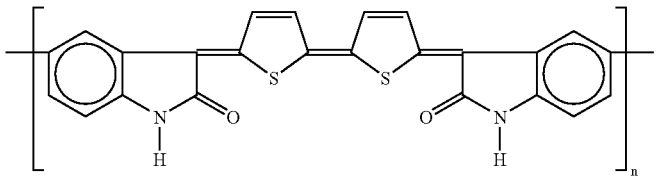
Polyvinylpyridin:

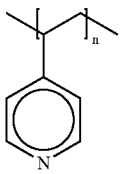

Especially preferred in accordance with the invention are cross-linked polymers with repeat units of the general formula (1A-1), (1B-1), (1C-1), (1I-1), (1G-1), (1E-1), (1H-1), (1I-1), (1F-1), (1J-1), (1K-1), (1L-1), (1M-1) and/or (1N-1).

In the context of the present invention, n designates the number of repeat units along one macromolecule chain of the cross-linked polymer. This number of the repeat units of the general formula (1) along one macromolecule chain of the cross-linked polymer is preferably an integer greater than or equal to 10, in particular greater than or equal to 100. The number of repeat units of the general formula (1A), (1B), (1C), (1D), (1E), (1F), (1G), (1H), (1I), (1J), (1K), (1L), (1M), (1N), (1O), (1P), (1Q), (1R), (1S) and/or (1T) along one macromolecule chain of the cross-linked polymer is preferably an integer greater than or equal to 10, in particular greater than or equal to 100.

In one particularly preferred embodiment of the present invention, the numerical average of the molecular weight of the macromolecular chain is greater than 25,000 g/mol, appropriately greater than 50,000 g/mol, in particular greater than 100,000 g/mol.

The invention claimed is:

1. Modified polymers or polymer blends or polymer (blend) membranes or polymer moulded bodies, comprising a polymer containing at least sulfinate groups $SO_2M$, a polymerblend containing at least sulfinate groups $SO_2M$, a polymer(blend)membrane containing at least sulfinate groups $SO_2M$ or other moulded bodies containing at least sulfinate groups $SO_2M$, wherein M represents 1-, 2- or 3-valent metal cation or ammonium ion $NR_4^+$, wherein R represents H and/or alkyl and/or Aryl or imidazolium ion or pyrazolium ion or pyridinium ion, wherein sulfinate groups are subjected to S-alkylation reactions of the sulfinate group, wherein ALK represents any alkylation agent or mixture of different alkylation agents, that react by S-Alkylation either by substitution or by addition (with olefins with electron-attracting groups) with the sulfinate group:

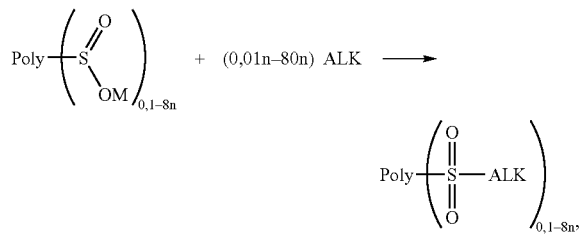

thereby the alkylation agent shows 1 or 2 or >2 alkylation groups.

2. The modified polymers or polymer blends or polymer (blend) membranes or polymer moulded bodies according to claim 1 wherein M represents alkali ions selected from the group consiting of $Li^+$, $Na^+$, $K^+$, $Rb^+$, and $Cs^+$ or M represents other monovalent cations selected from the group consisting of $Cu^+$ and $Ag^+$, wherein 0,1 to 8 alkylation groups and respecive sulfinate groups per polymer repeat unit are present, and the alkylation agent or mixture of alkylation agents includes 1 or 2 groups which can be alkylated.

3. The modified polymers or polymer blends or polymer (blend) membranes or polymer moulded bodies according to claim 1 wherein alkylation agents are selected from the group consisting of high-molecular or low-molecular halogen compounds $(Hal)_n$-Al or $(Hal)_n$-Ar or $(Hal-CH_2)_n$-Ar or $(Hal-Ar)_n$-Al, wherein n represents a number between 1 and 1000, sultones, epoxy groups containing high-molecular or low-molecular compounds, alkoxy groups containing high-molecular or low-molecular compounds, tosylate groups containing high-molecular or low-molecular compounds, other nucleophilic leaving groups, and olefin groups with electron-attracting groups containing high-molecular or low-molecular compounds containing organic compounds, wherein R=alkyl, aryl, hetaryl, any organic radicals, M represents alkali ions or alkaline-earth ions or any monovalent or bivalent metal cation or ammonium cation, polymer represents any polymer main chain, Hal represents F, Cl, Br, I, x represents a number between 2 and 20, X represents electron-attracting-groups, n represents the number of repeat units (RU) of the base polymer:

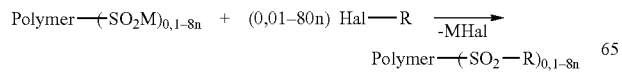

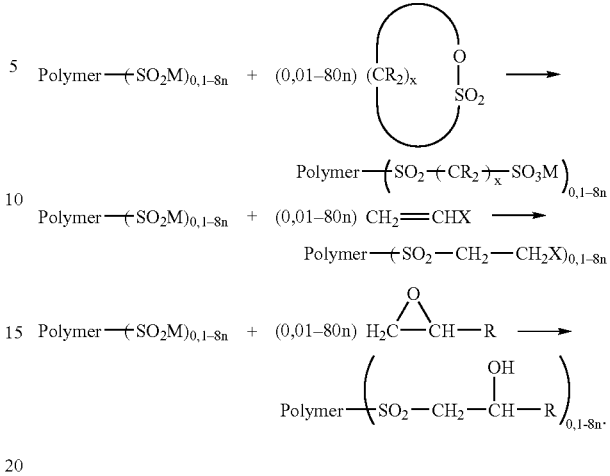

4. The modified polymers or polymer blends or polymer (blend) membranes or polymer moulded bodies according to claim 3 wherein the sultone is a 4-, 5-6- or 7-ring-sultone, in which also benzosultones can be used:

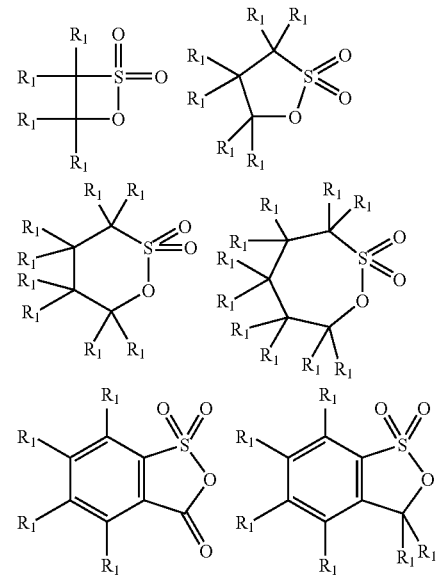

$R_1$ = H and/or Hal, $C_nH_{2n-1}$, $C_nHal_{2n-1}$ with n = 1–30 and Hal = F, Cl, Br, I.

5. The modified polymers or polymer blends or polymer (blend) membranes or polymer moulded bodies according to claim 3 or 4 wherein the sultone is a sultone 4- or 5-ring-(benz)sultones.

6. The modified polymers or polymer blends or polymer (blend) membranes or polymer moulded bodies according to claim 3 wherein halogen containing compounds include those compounds that contain one or more anion exchange groups:

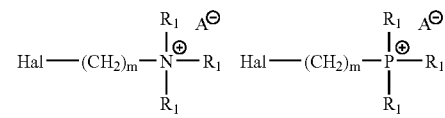

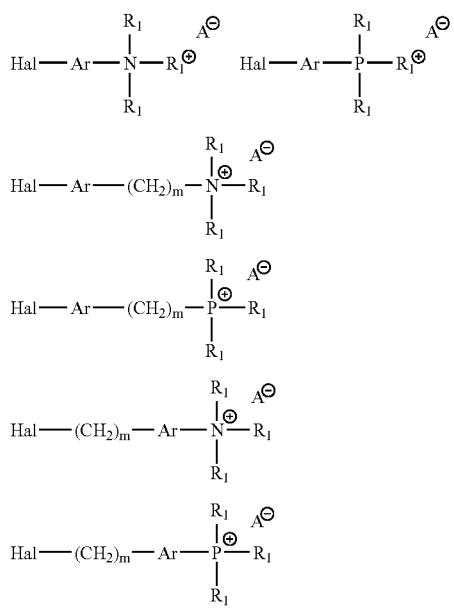

m = 1–30, $R_1$ = H and/or $C_nH_{2n-1}$, and/or Aryl, Hetaryl, Phenyl, with
n = 1–30 and A = Hal (F, Cl, Br, I), OH, any anion, Ar = any Arylene radical.

7. The modified polymers or polymer blends or polymer (blend) membranes or polymer moulded bodies according to claim 6 wherein m represents a number between 1 and 10, $R_1$ represents $C_nH_{2n-1}$ with n represents a number between 1 and 12 and/or phenyl and Hal represents Cl, Br or I and Ar represents 1,4-phenylen.

8. The modified polymers or polymer blends or polymer (blend) membranes or polymer moulded bodies according to claim 3 wherein the halogen compound is a benzyl compound wherein R represents any organic radical:

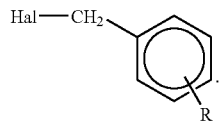

9. The modified polymers or polymer blends or polymer (blend) membranes or polymer moulded bodies according to claim 8 wherein the benzyl compound is:

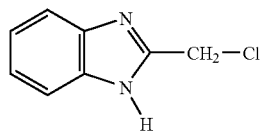

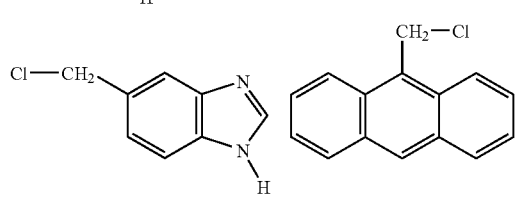

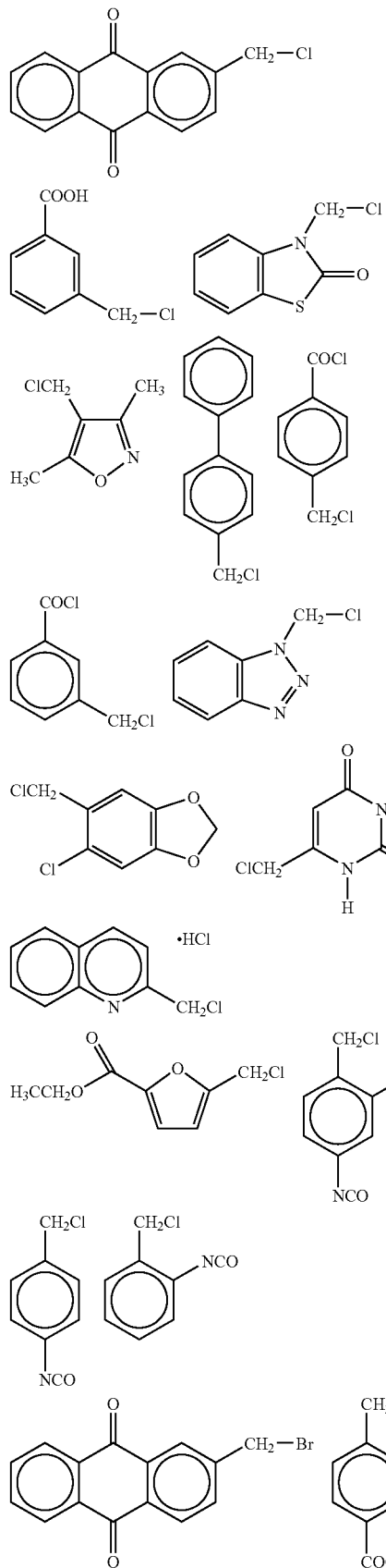

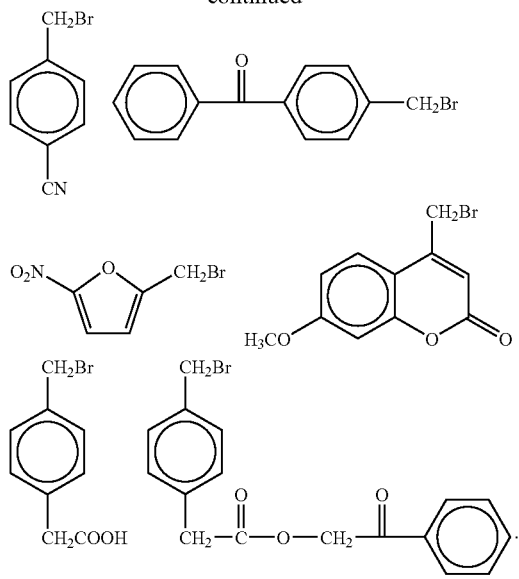

10. The modified polymers or polymer blends or polymer (blend) membranes or polymer moulded bodies according to claim 3 wherein the halogen compound a haloamine:

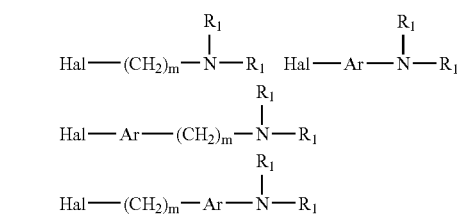

m = 1–30, R$_1$ = H and/or C$_n$H$_{2n-1}$, and/or Aryl,
Hetaryl, Phenyl, with n = 1–30 Ar = any Arylene radical.

11. The modified polymers or polymer blends or polymer (blend) membranes or polymer moulded bodies according to claim 3 wherein the halogen compound contains cation exchange groups or their non-ionic precursor:

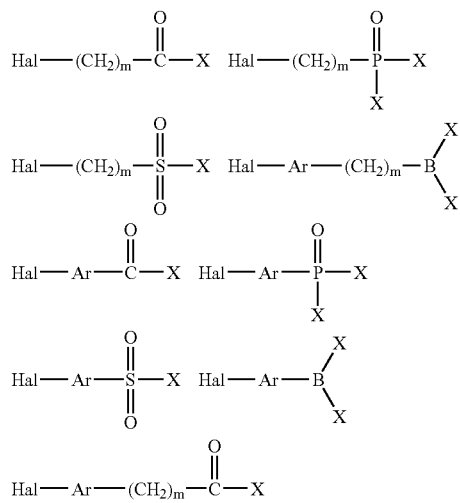

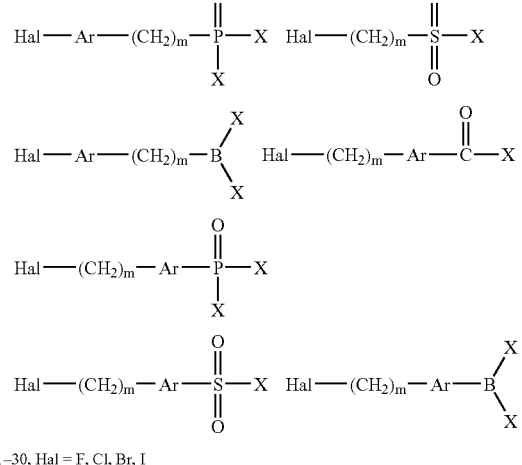

m = 1–30, Hal = F, Cl, Br, I
Ar = any Arylene radical
X = OM (M = H or any cation), Hal, OR$_1$, N(R$_1$)$_2$,
with R$_1$ = H and/or C$_n$H$_{2n-1}$, and/or Aryl, Hetaryl,
Phenyl, with n = 1–30, NHR$_2$ with R$_2$ = C$_n$F$_{2n+1}$ and n = 1–30.

12. The modified polymers or polymer blends or polymer (blend) membranes or polymer moulded bodies according to claim 11 wherein the halogen compound includes:

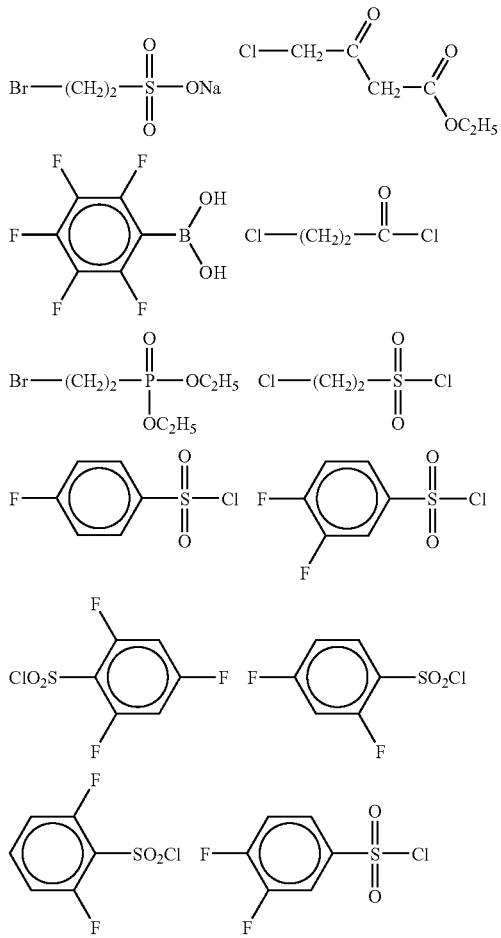

-continued

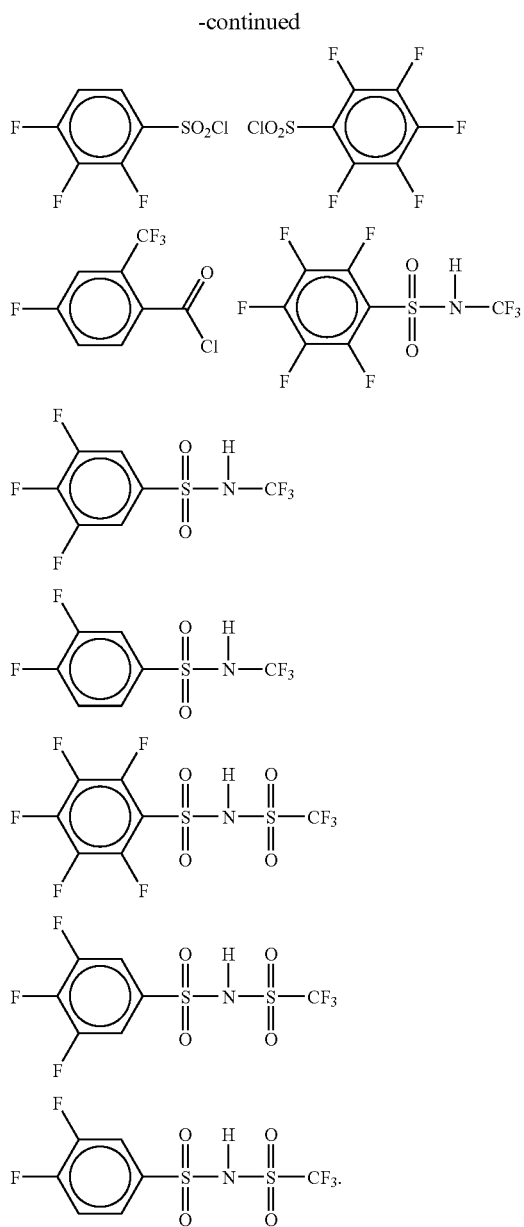

13. The modified polymers or polymer blends or polymer (blend) membranes or polymer moulded bodies according to claim 3 wherein the halogen compounds are arylhalogen compounds or hetarylhalogen compounds.

14. The modified polymers or polymer blends or polymer (blend) membranes or polymer moulded bodies according to claim 13 wherein the halogen compounds contain substructures:

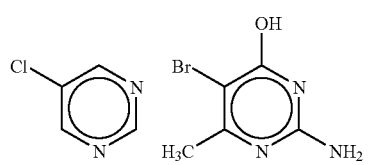

-continued

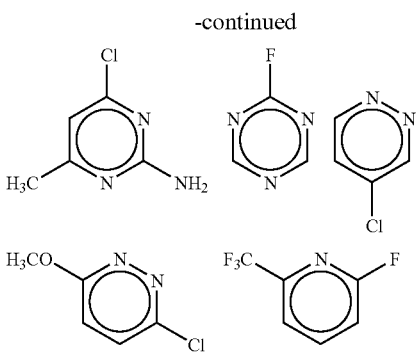

Polymer—SO$_2$M + Hal—Z $\xrightarrow[-\text{MHal}]{}$ Polymer—SO$_2$—Z.

15. The modified polymers or polymer blends or polymer (blend) membranes or polymer moulded bodies according to claim 13 wherein the halogen compounds, reactive dyes include reactive groups selected from the group consisting of dichlorotriazine, difluoropyrimidine, monofluorotriazine, dichlorochinoxaline, monochlortriazine, trichloropyrimidine, mononicotinic acid triazine, and Michael-acceptors such as vinylsulfone or their sulphuric acid ester

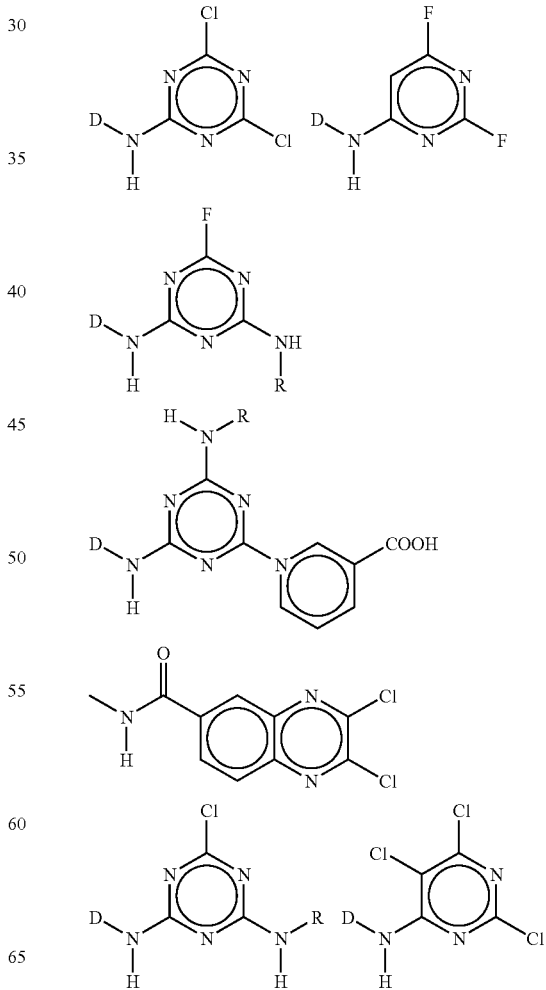

-continued

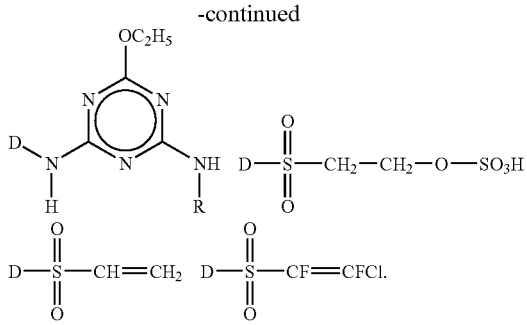

16. The modified polymers or polymer blends or polymer (blend) membranes or polymer moulded bodies according to claim 14 wherein the reactive dyes may contain chromophores selected from the group consisting of
Azo with arylpyrazol-5-one as coupling component,
Azo with I-acid as coupling component (CC),
Azo with H-acid as CC,
Azo-copper complex with H-acid as CC,
Coppercomplex-formazane,
Phtalocyanine,
Anthrachinone,
Triphendioxazine,
Disazo with H-acid as CC, and
Azo-Coppercomplex with 1-aryl-pyrazol-5-on as CC.

17. The modified polymers or polymer blends or polymer (blend) membranes or polymer moulded bodies according to claim 16 wherein base polymers of the modified polymers, polymer blends, polymer (blend) membranes include:
polyolefines such as polyethylene, polypropylene, polyisobutylene, polynorbornene, polymethylpentene, polyisoprene, poly(1,4-butadiene), poly(1,2-butadiene),
styrol(co)polymers such as polystyrol, poly(methylstyrol), poly($\alpha,\beta,\beta$-trifluorstyrol), poly(pentafluorostyrol),
perfluorinated ionomers such as Nafion® or the $SO_2$Hal-precursor or the $SO_2$M-precursor wherein Hal represents F, Cl, Br, I,
sulfonated PVDF and/or the $SO_2$Hal-precursor, in which Hal represents fluorine, chlorine, bromine or iodine,
(het)aryl mainchain polymers such as:
polyetherketones such as polyetherketone PEK, polyetheretherketone PEEK, polyetheretherketonketone PEEKK, polyetherketonether-ketonketone PEKEKK, polyetheretherketone PEEKK, polyetherketonketone PEKK,
polyethersulfone such as polysulfone and polyphenylsulfone,
poly(benz)imidazole and other oligomers and polymers containing the (benz)imidazol-unit, in which the (benz)imidazol group can be present in the main chain or in the side chain,
polyphenylenether such as poly(2,6-dimethyloxyphenylen), poly(2,6-diphenyloxyphenylen),
polyphenylensulfide and copolymers,
poly(1,4-phenylene) or poly(1,3-phenylene), which can be modified in the side chain with benzoyl-, naphtoyl- or o-phenyloxy-1,4-benzoylgroups, m-phenyloxy-, 1,4-benzoylgroups or p-phenyloxy-1,4-benzoylgroups,
poly(benzoxazole) and copolymers,
poly(benzthiazole) and copolymers,
poly(phtalazinone) and copolymers, and
polyaniline and copolymers.

18. The modified polymers or polymer blends or polymer (blend) membranes or polymer moulded bodies according to claim 17 wherein base polymers (Het)aryl main chain polymers consist of the following construction units where R represents construction units, BrG represents bridging groups between construction units and n represents the number of polymer repeat units (RE)

(—(R—BrG)$_n$—):

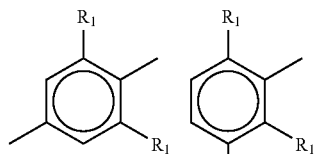

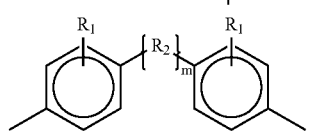

R = 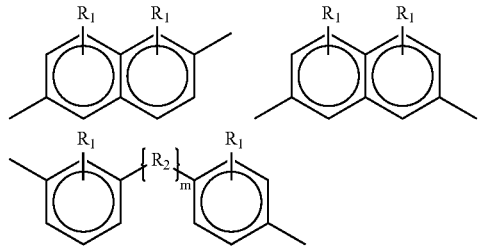

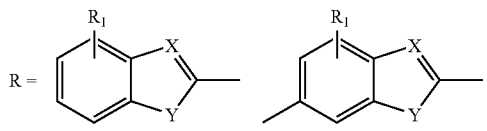

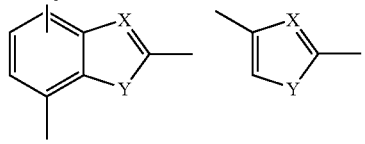

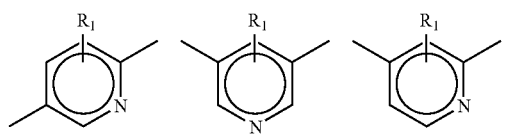

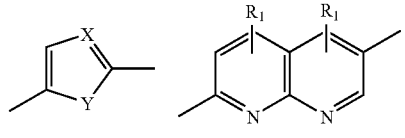

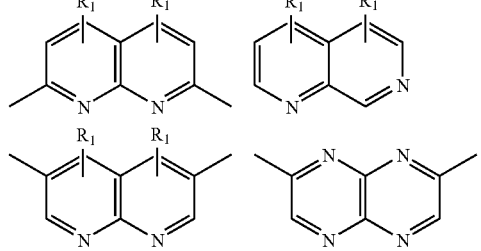

-continued

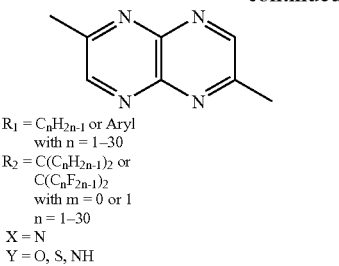

$R_1 = C_nH_{2n-1}$ or Aryl with n = 1–30
$R_2 = C(C_nH_{2n-1})_2$ or $C(C_nF_{2n-1})_2$ with m = 0 or 1 n = 1–30
X = N
Y = O, S, NH

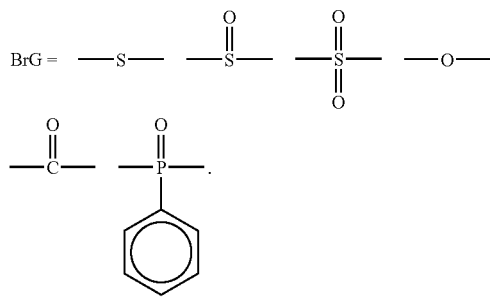

19. The modified polymers or polymer blends or polymer (blend) membranes or polymer moulded bodies according to claim 18 polymer includes aryl main chain polymers selected from the group consisting of polyethersulfones;

polyphenylene such as poly-p-phenylene, poly-m-Phenylene and poly-p-stat-m-phenylene;

polyphenyleneether such as poly(2,6-dimethylphenyleneether) and poly(2,6-diphenylphenyleneether);

polyphenylensulfide, polyetherketone such as polyetheretherketone PEEK, Polyetherketone PEK, polyetheretherketoneketone PEEKK, polyetherketoneketone PEKK, polyetherketonetherketoneketone PEKEKK.

20. The modified polymers or polymer blends or polymer (blend) membranes or polymer moulded bodies according to claim 19 wherein the polymers can carry in addition the following functional groups in any position: $NO_2$, Hal, $R_2$, $N(R_2)_2$, $SO_2R_2$, NO, $SO_2Hal$, $SO_2N(R_2)_2$, $R_9=C_n(C_nH_{2n-1})_{2n-1}$, $R_9=C_n(Hal)_{2n-1}$, $R_9=C_n(C_n(Hal)_{2n-1})_{2n-1}$ (n=1-20), H, Hal (Hal=F, Cl, Br, I), $R_9$, $OR_9$ mit $R_9=C_n(Hal)_{2n-1}$, $R_9=C_n(C_nH_{2n-1})_{2n-1}$, $R_9=C_n(Hal)_{2n-1}$, $R_9=C_n(C_n(Hal)_{2n-1})_{2n-1}$ (n=1-20), phenyl, naphtyl, anthracenyl, aryl, hetaryl, $N(R_3)_2$, $N_3$, $NO_2$, ONO, nitroalkyl, nitroaryl, $COOR_9$.

* * * * *

UNITED STATES PATENT AND TRADEMARK OFFICE
CERTIFICATE OF CORRECTION

PATENT NO. : 7,288,599 B2  
APPLICATION NO. : 10/929991  
DATED : October 30, 2007  
INVENTOR(S) : Jochen Kerres and Thomas Haering It is certified that error appears in the above-identified patent and that said Letters Patent is hereby corrected as shown below:

In Column 23, line 27, in claim 2, delete "consiting" and insert -- consisting --.

In Column 23, approximately line 30, in claim 2, delete "respecive" and insert -- respective --.

In Column 24, line 23, in claim 4, delete "5-6-" and insert -- 5-, 6- --.

In Column 25, line 35, in claim 7, delete "phenylen." and insert -- phenylene. --.

Signed and Sealed this

Twenty-eighth Day of October, 2008

JON W. DUDAS  
*Director of the United States Patent and Trademark Office*